US00RE48726E

(19) United States
(12) Reissued Patent
Sasai et al.

(10) Patent Number: US RE48,726 E
(45) Date of Reissued Patent: *Sep. 7, 2021

(54) IMAGE DECODING METHOD, IMAGE CODING METHOD, IMAGE DECODING APPARATUS, IMAGE CODING APPARATUS AND INTEGRATED CIRCUIT FOR GENERATING A CODE STREAM WITH A HIERARCHICAL CODE STRUCTURE

(71) Applicant: Sun Patent Trust, New York, NY (US)

(72) Inventors: Hisao Sasai, Osaka (JP); Takahiro Nishi, Nara (JP); Youji Shibahara, Tokyo (JP); Chong Soon Lim, Singapore (SG); Viktor Wahadaniah, Singapore (SG); Xuan Jing, Singapore (SG); Sue Mon Thet Naing, Singapore (SG)

(73) Assignee: SUN PATENT TRUST, New York, NY (US)

( * ) Notice: This patent is subject to a terminal disclaimer.

(21) Appl. No.: 15/591,493

(22) Filed: May 10, 2017

Related U.S. Patent Documents

Reissue of:
(64) Patent No.: 9,167,264
Issued: Oct. 20, 2015
Appl. No.: 14/578,794
Filed: Dec. 22, 2014

U.S. Applications:
(63) Continuation of application No. 15/591,308, filed on May 10, 2017, which is an application for the reissue
(Continued)

(51) Int. Cl.
*G06K 9/36* (2006.01)
*G06K 9/46* (2006.01)
(Continued)

(52) U.S. Cl.
CPC ..... *H04N 19/503* (2014.11); *G06T 9/004* (2013.01); *H04N 19/17* (2014.11); *H04N 19/463* (2014.11); *H04N 19/70* (2014.11); *H04N 19/96* (2014.11)

(58) Field of Classification Search
None
See application file for complete search history.

(56) References Cited

U.S. PATENT DOCUMENTS 5,122,875 A 6/1992 Raychaudhuri et al.
5,949,911 A 9/1999 Chui et al.
(Continued)

FOREIGN PATENT DOCUMENTS

CN 101019435 8/2007
CN 101411201 4/2009
(Continued)

OTHER PUBLICATIONS

Definition for processor, IEEE 100, The Authoritative Dictionary of IEEE Standards Terms, Seventh Edition, 2000.*
(Continued)

*Primary Examiner* — Yuzhen Ge
(74) *Attorney, Agent, or Firm* — Wenderoth, Lind & Ponack, L.L.P.

(57) ABSTRACT

An image decoding method decodes a coded stream which includes processing units and a header of the processing units, and which is generated by coding a moving picture using inter prediction. The processing units includes at least one processing unit divided in a hierarchy, the hierarchy including a highest hierarchical layer in which a coding unit exists as a largest processing unit and a lower hierarchical layer in which a prediction unit exists. The method includes identifying, by parsing hierarchy depth information stored in the header and indicating a hierarchical layer higher than a lowest hierarchical layer in which a smallest prediction unit
(Continued)

exits, a hierarchical layer which is indicated by the hierarchy depth information or a hierarchical layer higher than the indicated hierarchical layer. The hierarchical layer includes a prediction unit in which a reference index is stored. The prediction unit is decoded using the reference index.

3 Claims, 39 Drawing Sheets

Related U.S. Application Data of Pat. No. 9,167,264, which is a continuation of application No. 13/876,276, filed as application No. PCT/JP2011/005495 on Sep. 29, 2011, now Pat. No. 8,965,139.

(60) Provisional application No. 61/387,541, filed on Sep. 29, 2010.

(51) Int. Cl.

| | |
|---|---|
| ***H04N 19/503*** | (2014.01) |
| ***H04N 19/17*** | (2014.01) |
| ***H04N 19/463*** | (2014.01) |
| ***H04N 19/70*** | (2014.01) |
| ***H04N 19/96*** | (2014.01) |
| ***G06T 9/00*** | (2006.01) |

(56) References Cited

U.S. PATENT DOCUMENTS

| | | | | |
|---|---|---|---|---|
| 6,041,143 | A | 3/2000 | Chui et al. | |
| 7,515,635 | B2 | 4/2009 | Hagai et al. | |
| 7,701,365 | B2 | 4/2010 | Fukuhara et al. | |
| 8,009,733 | B2 | 8/2011 | Hagai et al. | |
| 8,184,697 | B2 | 5/2012 | Hagai et al. | |
| 8,204,112 | B2 | 6/2012 | Hagai et al. | |
| 8,208,542 | B2 | 6/2012 | Hagai et al. | |
| 8,223,841 | B2 | 7/2012 | Hagai et al. | |
| 8,238,428 | B2 | 8/2012 | Karczewicz | |
| 8,230,693 | B2 | 11/2012 | Fukuhara et al. | |
| 8,320,693 | B2 | 11/2012 | Fukuhara et al. | |
| 8,406,299 | B2 | 3/2013 | Karczewicz | |
| 8,488,672 | B2 | 7/2013 | Karczewicz | |
| 8,937,988 | B2 | 1/2015 | Tzannes | |
| 8,937,998 | B2 | 1/2015 | Karczewicz | |
| 9,743,087 | B2 | 8/2017 | Sasai et al. | |
| 9,936,216 | B2 * | 4/2018 | Min | H04N 19/50 |
| 2004/0057523 | A1 * | 3/2004 | Koto | H04B 1/662 375/240.26 |
| 2004/0146105 | A1 | 7/2004 | Hagai et al. | |
| 2005/0123056 | A1 * | 6/2005 | Wang | H04N 19/70 375/240.25 |
| 2006/0114989 | A1 | 6/2006 | Panda | |
| 2006/0159169 | A1 | 7/2006 | Hui et al. | |
| 2006/0209952 | A1 | 9/2006 | Tanizawa et al. | |
| 2006/0285591 | A1 | 12/2006 | Hagai et al. | |
| 2007/0086518 | A1 * | 4/2007 | Jeon | H04N 19/56 375/240.1 |
| 2007/0147493 | A1 * | 6/2007 | Jeon | H04N 19/61 375/240.1 |
| 2007/0206679 | A1 | 9/2007 | Lim et al. | |
| 2008/0069213 | A1 | 3/2008 | Hagai et al. | |
| 2008/0069214 | A1 | 3/2008 | Hagai et al. | |
| 2008/0069215 | A1 | 3/2008 | Hagai et al. | |
| 2008/0069216 | A1 | 3/2008 | Hagai et al. | |
| 2008/0260027 | A1 | 10/2008 | Karczewicz | |
| 2008/0260030 | A1 | 10/2008 | Karczewicz | |
| 2008/0260031 | A1 | 10/2008 | Karczewicz | |
| 2009/0041433 | A1 | 2/2009 | Coles et al. | |
| 2009/0076828 | A1 | 3/2009 | Li | |
| 2009/0080535 | A1 * | 3/2009 | Yin | H04N 19/63 375/240.26 |
| 2009/0102686 | A1 | 4/2009 | Fukuhara et al. | |
| 2009/0116558 | A1 * | 5/2009 | Chen | H04N 19/597 375/240.16 |
| 2009/0196517 | A1 * | 8/2009 | Divorra Escoda | H04N 19/61 382/240 |
| 2009/0274378 | A1 | 11/2009 | Fukuhara et al. | |
| 2009/0297053 | A1 | 12/2009 | Nakamura et al. | |
| 2010/0014763 | A1 | 1/2010 | Wittmann et al. | |
| 2010/0061444 | A1 | 3/2010 | Wilkins et al. | |
| 2010/0074338 | A1 | 3/2010 | Yamori et al. | |
| 2010/0086028 | A1 | 4/2010 | Tanizawa et al. | |
| 2010/0272174 | A1 | 10/2010 | Tomo et al. | |
| 2011/0090967 | A1 | 4/2011 | Chen et al. | |
| 2011/0096835 | A1 * | 4/2011 | Lim | H04N 19/597 375/240.12 |
| 2011/0110429 | A1 * | 5/2011 | La | H04N 5/145 375/240.16 |
| 2011/0194613 | A1 * | 8/2011 | Chen et al. | H04N 19/107 375/240.24 |
| 2011/0249743 | A1 * | 10/2011 | Zhao | H04N 19/70 375/240.16 |
| 2012/0051431 | A1 | 3/2012 | Chien et al. | |
| 2012/0106652 | A1 * | 5/2012 | Huang et al. | 375/240.25 |
| 2012/0250770 | A1 | 10/2012 | Hagai et al. | |
| 2012/0251015 | A1 * | 10/2012 | Lim et al. | 382/233 |
| 2012/0300835 | A1 | 11/2012 | Karczewicz | |
| 2012/0314027 | A1 * | 12/2012 | Tian | H04N 7/181 348/43 |
| 2013/0058410 | A1 | 3/2013 | Yasugi et al. | |
| 2013/0071039 | A1 | 3/2013 | Sato | |
| 2013/0301739 | A1 | 11/2013 | Sato | |
| 2014/0056356 | A1 * | 2/2014 | Yu et al. | 375/240.16 |
| 2014/0321536 | A1 | 10/2014 | Sato | |
| 2014/0321537 | A1 | 10/2014 | Sato | |
| 2014/0321538 | A1 | 10/2014 | Sato | |
| 2016/0007028 | A1 | 1/2016 | Yamori et al. | |
| 2016/0007029 | A1 | 1/2016 | Yamori et al. | |
| 2016/0007030 | A1 | 1/2016 | Yamori et al. | |
| 2016/0007031 | A1 | 1/2016 | Yamori et al. | |
| 2016/0165255 | A1 | 6/2016 | Yasugi et al. | |
| 2018/0007370 | A1 | 1/2018 | Sato | |
| 2019/0104318 | A1 | 4/2019 | Sato | |
| 2019/0238874 | A1 | 8/2019 | Yasugi et al. | |

FOREIGN PATENT DOCUMENTS

| | | |
|---|---|---|
| CN | 101861735 | 10/2010 |
| EP | 2 051 529 | 4/2009 |
| JP | 2004-007563 | 1/2004 |
| JP | 2006-262004 | 9/2006 |
| JP | 2008-522500 | 6/2008 |
| JP | 2008-206211 | 9/2008 |
| JP | 2010-525677 | 7/2010 |
| JP | 2013-009165 | 1/2013 |
| JP | 2013-524669 | 6/2013 |
| RU | 2 128 405 | 3/1999 |
| RU | 2 340 114 | 11/2008 |
| WO | 92/16071 | 3/1999 |
| WO | 2008/126135 | 10/2008 |
| WO | 2008/131045 | 10/2008 |
| WO | 2008/131045 A2 | 10/2008 |
| WO | 2008/132890 | 11/2008 |
| WO | 2009/151232 | 12/2009 |
| WO | 2009/158113 | 12/2009 |
| WO | 2010/070818 | 6/2010 |
| WO | 2011/140211 | 11/2011 |
| WO | 2011/142279 | 11/2011 |
| WO | 2011/152518 | 12/2011 |

OTHER PUBLICATIONS

Definition of decoder and parse, Microsoft Computer Dictionary, 2002.*

H.26L Test Model Long Term No. 5 (TML-5) draft0, Oct. 25, 2000, ITU.*

Integrated Multimedia Selection Manual MPEG, Ohmsha, the Institute of Image Information and Television Engineers, May 30, 1997, p. 83-85 with English translation.

(56) References Cited

OTHER PUBLICATIONS

International Search Report dated Dec. 13, 2011 in International Application No. PCT/JP2011/005507.
International Search Report dated Dec. 13, 2011 in International Application No. PCT/JP2011/005520.
International Search Report dated Dec. 13, 2011 in International (PCT) Application No. PCT/JP2011/005495.
U.S. Office Action dated Jan. 30, 2015 in U.S. Appl. No. 13/818,702.
Extended European Search Report dated Dec. 11, 2014, in European Application No. 11828456.1.
U.S. Office Action dated Nov. 4, 2016 in U.S. Appl. No. 15/246,960.
Extended European Search Report dated Oct. 21, 2016 in European Application No. 16188259.2.
"Test Model under Consideration", 2. JCT-VC Meeting; Jul. 21, 2010-Jul. 28, 2010; Geneva; (Joint Collaborative Team on Video Coding of ISO/IEC JTC1/SC29/WG11 and ITU-TSG.16); URL:http://wftp3.itu.int/av-arch/jctvc-site/, No. JCTVC-B205(draft000), Jul. 28, 2010, XP30007704, ISSN: 0000-0046.
"Test Model under Consideration", 2. JCT-VC Meeting; Jul. 21, 2010-Jul. 28, 2010; Geneva; (Joint Collaborative Team on Video Coding of ISO/IEC JTC1/SC29/WG11 and ITU-TSG.16); URL:http://wftp3.itu.int/av-arch/jctvc-site/, No. JCTVC-B205(draft000), Jul. 28, 2010, XP030007704, ISSN:0000-0046.
Office Action dated Oct. 13, 2017 issued for U.S. Appl. No. 15/633,917.
Office Action dated Jul. 6, 2018 issued for Indian Application No. 1363/CHENP/2013.
Kemal Ugur et al., "Appendix to Description of video coding technology proposal by Tandberg Nokia Ericsson", Joint Collaborative Team on Video Coding (JCT-VC) of ITU-T SG16 WP3 and ISO/IEC JTC1/SC29/WG11, 1st Meeting: Dresden, DE, Apr. 15-23, 2010 JCTVC-A119_Appendix_Decoder_Description.
Office Action dated Sep. 12, 2018 issued for U.S. Appl. No. 15/591,308.
Office Action dated Dec. 19, 2018 issued for European Application No. 16 188 259.2.
Summons to attend oral proceedings issued Sep. 24, 2020 in European Application No. 16 188 259.2.
"Series H: Audio and Multimedia Systems Infrastructure of audiovisual services—Coding of moving video", Recommendation ITU-T H.264, Advanced video coding for generic audiovisual services, Jun. 3, 2010, H.264 (Mar. 2010), pp. 105-107.
"Series H: Audio and Multimedia Systems Infrastructure of audiovisual services—Coding of moving video", Recommendation ITU-T H.264, Advanced video coding for generic audiovisual services, H.264 (Mar. 2005), pp. 50-53, 85-95.
Office Action dated Mar. 9, 2021 for Indian Application No. 201848049681.
Office Action dated Jun. 27, 2019 in U.S. Appl. No. 16/019,705.
Office Action dated Oct. 28, 2020 in U.S. Appl. No. 16/801,228.
Office Action dated Apr. 23, 2021 issued for U.S. Appl. No. 16/801,228.
"Test Model under Consideration", Joint Collaborative Team on Video Coding (JCT-VC) of ITU-T SG16 WP3 and ISO/IEC JTC1/SC29/WG11, JCTVC-B205, 2nd Meeting: Geneva, CH, Jul. 21-28, 2010.
"Test Model under Consideration", Joint Collaborative Team on Video Coding (JCT-VC) of ITU-T SG16 WP3 and ISO/IEC JTC1/SC29/WG11, JCTVC-A205 (draft007), 1st Meeting: Dresden, DE, Apr. 15-23, 2010 (Date Saved: Jul. 2010).
Extended European Search Report issued Dec. 11, 2014, in European Application No. 11828456.1.
Tzu-Der Chuang et al., "AhG Quantization: Sub-LCU Delta QP", Mar. 10, 2011, No. JCTVC-E051, Mar. 10, 2011, XP030008557, ISSN: 0000-0007.
U.S. Office Action issued Jan. 30, 2015 in U.S. Appl. No. 13/818,702.

* cited by examiner

FIG. 1 "PRIOR ART"

FIG. 5 "PRIOR ART"

FIG. 13A

Sequence header

```
seq_parameter_set_rbsp( ) {
    profile_idc
    reserved_zero_8bits /* equal to 0 */
    level_idc
    seq_parameter_set_id
    bit_depth_luma_minus8
    bit_depth_chroma_minus8
    increased_bit_depth_luma
    line_bit_depth_chroma
    log2_max_frame_num_minus4
    log2_max_pic_order_cnt_lsb_minus4
    max_num_ref_frames
    gaps_in_frame_num_value_allowed_flag
    log2_min_coding_unit_size_minus3
    max_coding_unit_hierarchy_depth
    log2_min_transform_unit_size_minus2
    max_transform_unit_hierarchy_depth
    pic_width_in_luma_samples
    pic_height_in_luma_samples
    numExtraFilters
    for(i=0; i< numExtraFilters; i++){
      log2_filterCoeffPrecision
      halfNumTap
      for(j=0;j<(3*halfNumTap);j++){
        filterCoef[i][j]
      }
    }
    rbsp_trailing_bits( )
}
```

FIG. 13B

Picture header

```
pic_parameter_set_rbsp( ){
    pic_parameter_set_id
    seq_parameter_set_id
    entropy_coding_mode_flag
    num_ref_idx_l0_default_active_minus1
    num_ref_idx_l1_default_active_minus1
    pic_init_qp_minus26 /* relative to 26 */
    constrained_intra_pred_flag
    for(i=0;i<15; i++){
        numAllowedFilters[i]
        for(j=0;j<numAllowedFilters;j++){
            filtIdx[i][j]
        }
    }
    rbsp_trailing_bits()
}
```

d1

FIG. 13C

Slice header

```
slice_header( ) {
    first_lctb_in_slice
    slice_type
    pic_parameter_set_id
    frame_num
    if( IdrPicFlag )
        idr_pic_id
    pic_order_cnt_lsb
    if( slice_type = = P || slice_type = =B ) {
        num_ref_idx_active_override_flag
        if( num_ref_idx_active_override_flag ) {
            num_ref_idx_l0_active_minus1
            if( slice_type = =B )
                num_ref_idx_l1_active_minus1
        }
    }
    if( nal_ref_idc != 0 )
        dec_ref_pic_marking( )
    if(entropy_coding_mode_flag && slice_type != I )
        cabac_init_idc
    slice_qp_delta
    alf_param()
    if( slice_type = = P || slice_type = = B ) {
        mc_interpolation_idc
        mv_competition_flag
        if ( mv_competition_flag ) {
            mv_competition_temporal_flag
        }
    }
    if ( slice_type = = B && mv_competition_flag)
        collocated_from_l0_flag

    sifo_param ()
    if (entropy_coding_mode_flag == 3)
        parallel_v2v_header( )
    edge_based_prediction_flag
    if( edge_prediction_ipd_flag = = 1 )
        threshold_edge
}
```

d2 d3

FIG. 14A

CU

```
coding_unit( x0,y0, currCodingUnitSize ) {
    if( x0+currCodingUnitSize < PicWidthInSamples_L  &&  y0+currCodingUnitSize <
        PicHeightInSamples_L && currCodingUnitSize > MinCodingUnitSize )
        split_coding_unit_flag
    if( ( split_coding_unit_flag && currCodingUnitSize = = AlfMinCtrlCodingUnitSize ) ||
      ( !split coding unit flag && currCodingUnitSize > AlfCtrlMinCodingUnitSize )
        alf_flag
    if( split_coding_unit_flag ) {
      splitCodingUnitSize = currCodingUnitSize >> 1
        x1 = x0 + splitCodingUnitSize
        y1 = y0 + splitCodingUnitSize
        coding_unit( x0, y0, splitCodingUnitSize )
        if( x1 < PicWidthInSamples_L )
              coding_unit( x1, y0, splitCodingUnitSize )
        if( y1 < PicHeightInSamples_L )
              coding_unit( x0, y1, splitCodingUnitSize )
        if( x1 < PicWidthInSamples_L  && y1 < PicHeightInSamples_L )
              coding_unit( x1, y1, splitCodingUnitSize )
    } else {
      prediction_unit( x0, y0, currCodingUnitSize )
      if( PredMode != MODE_SKIP || !(PredMode = = MODE_INTRA && planar_flag = = 1) )
        transform_unit( x0, y0, currCodingUnitSize )
    }
}
```

d4 d5

FIG. 14B

PU

```
prediction_unit( x0, y0, currPredUnitSize ) {
    if( slice_type != I )
        skip_flag
    if( skip_flag ) {
        if( mv_competition_flag ) {
            if( inter_pred_idc != Pred_L1 && NumMVPCand(L0 ) > 1 )
                mvp_idx_l0
            if( inter_pred_idc !=Pred_L0 && NumMVPCand( L1 ) > 1 )
                mvp_idx_l1
        }
    }
    else {
        if(!entropy_coding_mode_flag)
            mode_table_idx
        else {
            if(slice_type != I )
                pred_mode
        }
    if( PredMode = = MODE_INTRA ) {
        planar_flag
        if(planar_flag) {
            planar_delta_y = getPlanarDelta()
            planar_delta_uv_present_flag
            if(planar_delta_uv_present_flag) {
                planar_delta_u = getPlanarDelta()
                planar_delta_v = getPlanarDelta()
            }
        } else {
            if(entropy_coding_mode_flag)
                intra_split_flag
                combined_intra_pred_flag
                for( i = 0; i < ( intra_split_flag ? 4 : 1 ); i++ ) {
                    prev_intra_luma_pred_flag
                    if( !prev_intra_pred_luma_flag )
                        rem_intra_luma_pred_mode
                }
        }
        if( chroma_format_idc != 0 )
            intra_chroma_pred_mode
        }
    }
```

FIG. 14C

```
else if( PredMode = = MODE_INTER ) {
    if( entropy_coding_mode_flag)
        inter_partitioning_idc
    for( i= 0; i < NumPuParts( inter_part itioning_idc ); i ++ ) {
        if( NumMergeCandidates > 0 ) {
            merge_flag[ i ]
            if(merge_fl ag[ i ] && NumMergeCandi dates > 1 )
                merge_left_flag[ i ]
        }
        if( !merge_flag[ i ] ) {
            if( slice_t ype = = B )
                inter_pred_idc[ i ]
            if( inter_pred_idc[ i ] != Pred_L1 ) {
                if( entropy_coding_mode_flag ) {
                    if( num_ref_idx_l0_active_minus1 > 0 )
                        ref_idx_l0[ i ]
                    mvres_l0 [ i ]
                }
                else {
                    ref_idx_mvres_l0[ i ]
                }
                mvd_l0[ i ][ 0 ]
                mvd_l0[ i ][ 1 ]
                if( mv_compet ition_flag && NumMVPCand( L0, i ) > 1 )
                    mvp_idx_l0[ i ]
            }
            if( inter_pred_idc[ i ] != P r ed_L0 ) {
                if( ent ropy_coding_mode_flag ) {
                    if( num_ref _idx_l1_active_mi nus1 > 0 )
                        ref_idx_l1[ i ]
                    mvres_l1 [ i ]
                }
                else {
                    ref_idx_mvres_l1[ i ]
                }
                mvd_l1[ i ][ 0 ]
                mvd_l1[ i ][ 1 ]
                if( mv_competition_flag && NumMVPCand( L1, i ) > 1 )
                    mvp_idx_l1[ i ]
            }
        }
    }
}
else if( PredMode = = MODE_DIRECT ) {
    if( slice_type = = B )
        inter_pred_idc
    if( mv_competition_flag ) {
        if( inter_pred_idc != Pred_L1 && NumMVPCand( L0 ) > 1 )
            mvp_idx_l0
        if( inter_pred_idc != Pred_L0 && NumMVPCand( L1 ) > 1 )
            mvp_idx_l1
    }
}
}
```

d6
d7
d8
d9

FIG. 14D

TU

```
transform_unit( x0, y0, currTransformUnitSize ) {
        if( currTransformUnitSize >   MinTransformUnitSize &&
            currTransformUnitSize <= MaxTransformUnitSize)
            split_transform_unit_flag
        if( split_transform_unit_flag ) {
            splitTransformUnitSize = currTransformUnitSize >> 1
            x1 = x0 + splitTransformUnitS ize
            y1 = y0 + splitTransformUnitSize
            if(!entropy_coding_mode_flag)
              getVLCCBP( )
            transform_unit(x0, y0, split TransformUnitSize)
            if( x1 < PicWidthInSamplesL )
                transform_unit( x1, y0, split TransformUnitSize)
            if( y1 < PicHeightInSamplesL )
                transform_unit( x0, y1, split TransformUnitSize)
            if( x1 < PicWidthInSamplesL && y1 < PicHeightInSamplesL )
                transform_unit( x1, y1, split TransformUnitSize)
        }else {
            if( entropy_coding_mode_flag)
                  coded_block_flag
            if( coded_block_flag ) {
                  rotational_transform_idx
                  if(!entropy_coding_mode_flag)
                    residual_block_vlc( )
                else
                    residual_block_v2v( )
            }
        }
}
```

d10

FIG. 21

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

ex800

| Corresponding standard | Driving frequency |
|---|---|
| MPEG-4 AVC | 500 MHz |
| MPEG-2 | 350 MHz |
| ⋮ | ⋮ |

IMAGE DECODING METHOD, IMAGE CODING METHOD, IMAGE DECODING APPARATUS, IMAGE CODING APPARATUS AND INTEGRATED CIRCUIT FOR GENERATING A CODE STREAM WITH A HIERARCHICAL CODE STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a continuation reissue of application Ser. No. 15/591,308, which is an application for reissue of U.S. Pat. No. 9,167,264, which issued Oct. 20, 2015 from U.S. application Ser. No. 14/578,794. More than one reissue application has been filed for the reissue of U.S. Pat. No. 9,167,264. The reissue applications are (i) application Ser. No. 15/591,493, filed May 10, 2017 (the present application, which is a continuation reissue of application Ser. No. 15/591,308), and (ii) application Ser. No. 15/591,308, filed May 10, 2017 (which is a reissue of U.S. Pat. No. 9,167, 264).*

TECHNICAL FIELD

The present invention relates to an imago coding method for coding images or moving pictures included in multimedia data and an image decoding method for decoding coded images or moving pictures.

BACKGROUND ART

In video compressions standards like MPEG-1 MPEG-2, MPEG-4, or MPEG-4 AVC, a compressed picture is usually divided into rectangular units called "macroblocks". A macroblock is usually defined as a two-dimensional block of image samples. The image samples have a width of 16 pixels and a height of 16 pixels for luminance samples. The compression ratio for the macroblock is controlled by a quantization scale parameter for each macroblock. The quantization scale parameter determines the level of quantization to be applied to all the frequency coefficients. The quantization scale parameter is usually coded as a difference value from the quantization scale parameter of the previous macroblock in cording order, and is stored in a compressed macroblock header.

In new video standards under development, for example, the High Efficiency Video Coding (HEVC) standard by the MPEG standardization bodies, it is suggested that dividing the picture into large units can improve the coding efficiency of the compressed video (for example, refer to Non Patent Literature 1). In other words, a picture can be divided into coding units (CU) where each coding unit has a size that can be much larger than a macroblock. For example, the coding unit size cart be 128 pixels by 128 pixels for luminance samples, which is approximately 64 times larger than a macroblock.

A large coding unit can be sub-divided into smaller units (sub coding units) to achieve better coding efficiency. Each coding unit or sub coding unit has three main components. The main components are a coding unit header, a prediction unit (PU), and a transform unit (TU).

FIG. 1 a diagram showing the structure of compressed picture having coding units.

As shown in FIG. 1, a picture D100 includes a header (hereinafter referred to as picture header) and a body. The picture header includes parameters related to the picture (picture parameters) while the body includes compressed samples of a picture. Moreover, the body includes coding units such as coding units D102 and D104, and some of the coding units are divided into sub coding units. For example, the coding unit D102 is divided into sub coding units D106, and one a the sub coding units 106 is further divided into smaller sub coding units D108. The coding unit D104 or sub coding unit D108 has three main components. More specifically, the coding unit D104 includes a coding unit header D116, a prediction unit D118, and a transform unit D120 as the three main components. The sub coding unit D108 has a sub coding unit header D110, as prediction D112, and a transform unit D114 as the three main components. As shown in FIG. 1, a transform unit D120 is divided into small sub transform units D122, and one of the sub transform units D122 is divided into smaller sub transform units D124. The smallest transform units (sub transform units) D114 and D124 includes the quantized coefficients of a block, which requires a quantization scale parameter for the inverse quantization process of the coefficients.

CITATION LIST

Non Patent Literature

[NPL 1]

Non Patent Literature

"Test Model under Consideration" Joint Collaborative Team on Video Coding (JCT-VC) of ITU-T SG16 WP3 and ISO/IEC JTC1/SC29/WG11, 2nd Meeting; Geneva, CH 21-28 Jul. 2010, Document JCTVC-B205

SUMMARY OF INVENTION

Technical Problem

However, in the image decoding method and the image coding method according to the above described Non Patent Literature 1, there is a problem that codling efficiency cannot be increased.

In other words, in the HEVC standard, the prediction of a coding unit is performed using at least one prediction unit. The CU on which inter prediction is performed is divided into four PUs. The division of the PU may be performed symmetrically or asymmetrically. The smallest size of the PU on which inter prediction is performed is a 4×4 luminance sample. A reference index (ref_idx) is transmitted on a per PU basis. It should be noted that the reference index is also called a reference frame index, and is an index indicating a reference image which is referred in the inter prediction. Here, the same reference index tends to be used for a small PU including the 4×4 sample and the like. Therefore, the transmission of the reference index for each of the small PUs makes a coded stream redundant, and consumes unnecessary bits. In other words, since on image coding apparatus needs to always transmit the reference index for each of the PUs, an overhead is increased when the reference index does not have to be switched in a small region such as a small PU. As a result, coding efficiency cannot be increased.

Therefore, the present invention is conceived in view of the problem, and an object of the present invention is to provide an image decoding method and an image coding method for improving coding efficiency.

Solution to Problem

In older to achieve the above described goal, an image decoding method according to an aspect of the present invention is an image decoding method for decoding a coded stream which includes a plurality of processing units and a header of the processing units, the coded stream being generated by coding a moving picture using inter prediction, the processing units including at least one processing unit divided into a plurality of sub processing units in a hierarchy which decrease in size from a higher level to a lower level, the hierarchy including: a highest hierarchical layer in which a coding unit exists as a largest processing unit; and a lower hierarchical layer which is deeper than the highest hierarchical layer and in which a prediction unit exists as a processing unit smaller than the coding unit, the image decoding method comprising: identifying, by parsing hierarchy depth information stored in the header and indicating a hierarchical layer higher than a lowest hierarchical layer in which a smallest prediction unit exits, a hierarchical layer which is indicated by the hierarchy depth information or a hierarchical layer higher than the indicated hierarchical layer, the hierarchical layer having a prediction unit in which a reference index necessary for decoding is stored; and decoding the prediction unit, using the reference index stored in the prediction unit at the identified hierarchical layer.

With this, since the prediction unit in which the reference index is stored is located at a higher hierarchical layer than the lowest hierarchical layer, the prediction unit includes a plurality of smaller prediction units. Since the prediction unit is decoded using the reference index stored in the prediction unit, the same reference index is used for each of the smaller prediction units included in the prediction unit. Therefore, the image coding apparatus does not have to repeatedly transmit the same reference index by repeatedly inserting the reference index into the small prediction units. As a result, coding efficiency can be increased.

In other words, in the image decoding method according to an aspect of the present invention, the smallest unit (smallest transmission unit) is introduced for transmitting the reference index such as a coding unit including an 8×8 sample in order to solve the above described problem. The smallest transmission unit is indicated by, for example, CU hierarchy depth information within a sequence parameter set, a picture parameter set, or a slice header. A reference index for the smallest transmission unit is transmitted, and the same reference index is used for all the PUs included in the smallest transmission unit.

In other words, the image coding apparatus stores the reference index in a larger unit (processing unit) located at a higher hierarchical layer than the PU, and stores hierarchy depth information for identifying the hierarchical layer (depth of hierarchical layer) in which the processing unit exists, in a header such as a sequence header or a picture header. The image decoding apparatus identifies the hierarchical layer (depth of hierarchical layer) by parsing hierarchy depth information located in the header, and parses the reference index stored in the processing unit located in the identified hierarchical layer. The reference index is applied to all the PUs included in the processing unit. Here, the hierarchy depth information may indicate the deepest (lowest) hierarchical layer in which the processing unit storing the reference index can exist. In this case, the image decoding apparatus identifies the lowest hierarchical layer indicated by the hierarchy depth information or a hierarchical layer that is higher than the lowest hierarchical layer. The hierarchy depth information may be a flag which indicates whether or not the reference index is stored in the CU at the predetermined hierarchical layer (for example, the CU located at the lowest layer).

Moreover, in order to achieve the above described goal, an image coding method according to an aspect of the present invention is an image coding method for generating a coded stream which includes a plurality of processing units and a header of the processing units, by coding a moving picture using inter prediction, the processing units including at least one processing unit divided into a plurality of sub processing units in a hierarchy which decrease in size from a higher level to a lower level, the hierarchy including: a highest hierarchical in which a coding unit exists as a largest processing unit; and a lower hierarchical layer which is deeper than the highest hierarchical layer and in which a prediction unit exists as a processing unit smaller than the coding unit, the image coding method comprising: coding the moving picture using inter prediction; writing, into the header, hierarchy depth information which is information for identifying a hierarchical layer haying a prediction unit in which a reference index necessary for decoding is stored and indicates a hierarchical layer higher thane lowest hierarchical layer in which a smallest prediction unit exists; and writing, into a prediction unit located at a hierarchical layer indicated by the hierarchy depth information or located higher than the indicated hierarchical layer, the reference index to be applied to the prediction unit.

With this, without repeatedly writing the same reference index into each of a plurality of small predicting units, only one reference index is written into a large processing unit which is located at a higher hierarchical layer than the prediction units and includes the prediction units. Therefore, the redundancy of the reference index can be removed and coding efficiency can be increased.

It should be noted that the present invention can be implemented as the above described image decoding method and image coding method. It can also be implemented as an apparatus for coding or decoding an image, an integrated circuit, a program for decoding or coding an image according to the methods, and a recording medium having the program stored thereon.

Advantageous Effects of Invention

With the image decoding method and the image coding method according to the present invention, coding efficiency can be increased. More specifically, by removing the redundancy in which the reference index is coded for each of the small PUs, coding efficiency can be increased and the amount of coding can be reduced.

BRIEF DESCRIPTION OF DRAWINGS

FIG. 13A is a diagram showing a syntax of sequence header according to Embodiment 1 of the present invention.

FIG. 13B is a diagram showing a syntax of picture header according to Embodiment 1 of the present invention.

FIG. 13C is a diagram showing a syntax of slice header according to Embodiment 1 of the present invention.

FIG. 14A is a diagram showing a syntax of coding unit (CU) according to Embodiment 1 of the present invention.

FIG. 14B is a diagram showing a syntax of prediction unit (PU) according to Embodiment 1 of the present invention.

FIG. 14C is a diagram showing a syntax of prediction unit (PU) according to Embodiment 1 of the present invention.

FIG. 14D is a diagram showing a syntax of transform unit (TU) according to Embodiment 1 of the present invention.

FIG. 21 illustrates a structure of multiplexed data.

DESCRIPTION OF EMBODIMENTS

Hereafter, the embodiments of the present invention will be described with reference the drawings.

Embodiment 1

Figure 1:
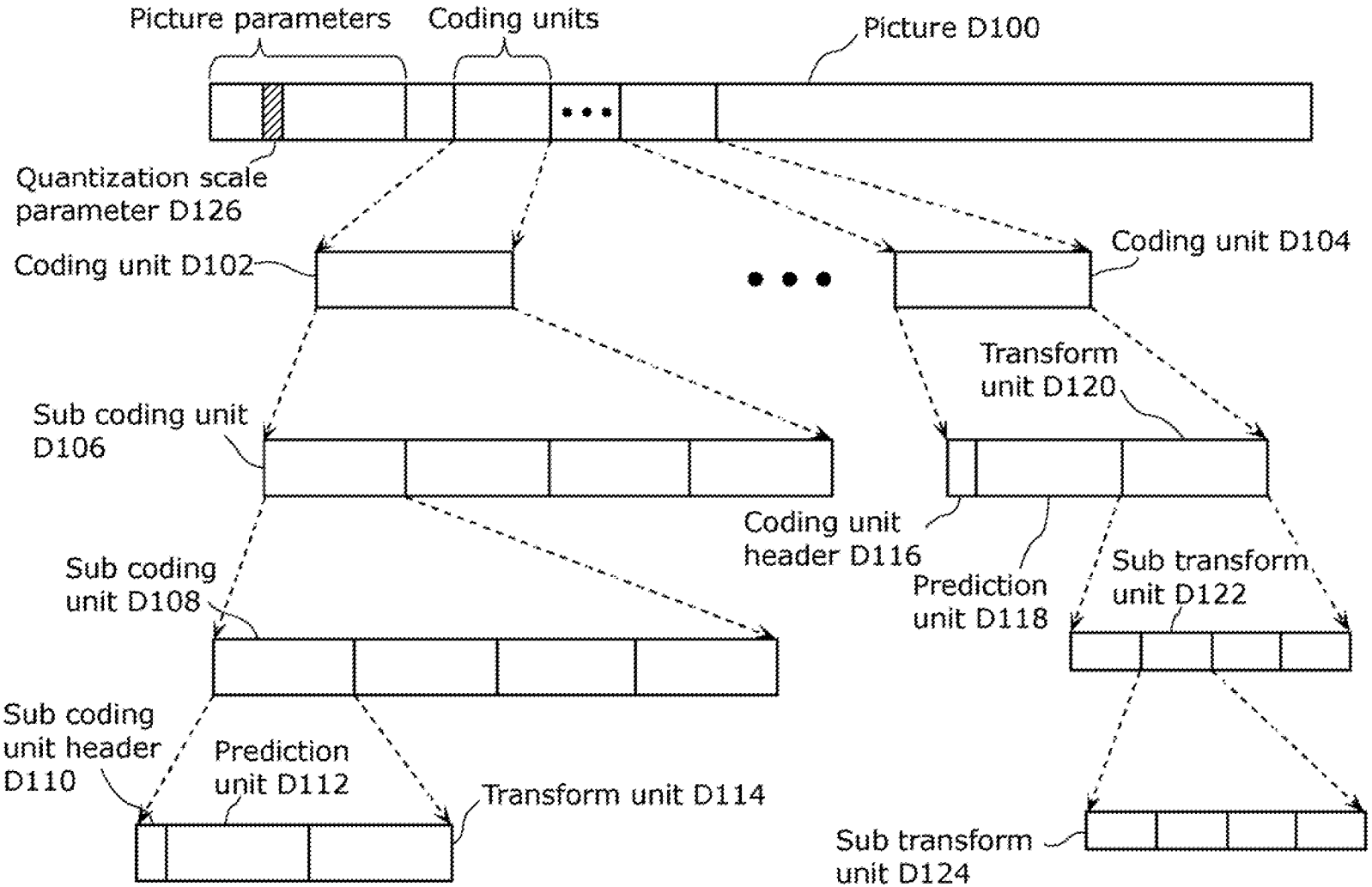
FIG. 1 is a diagram showing the configuration of a conventional coiled stream.
Figure 2:
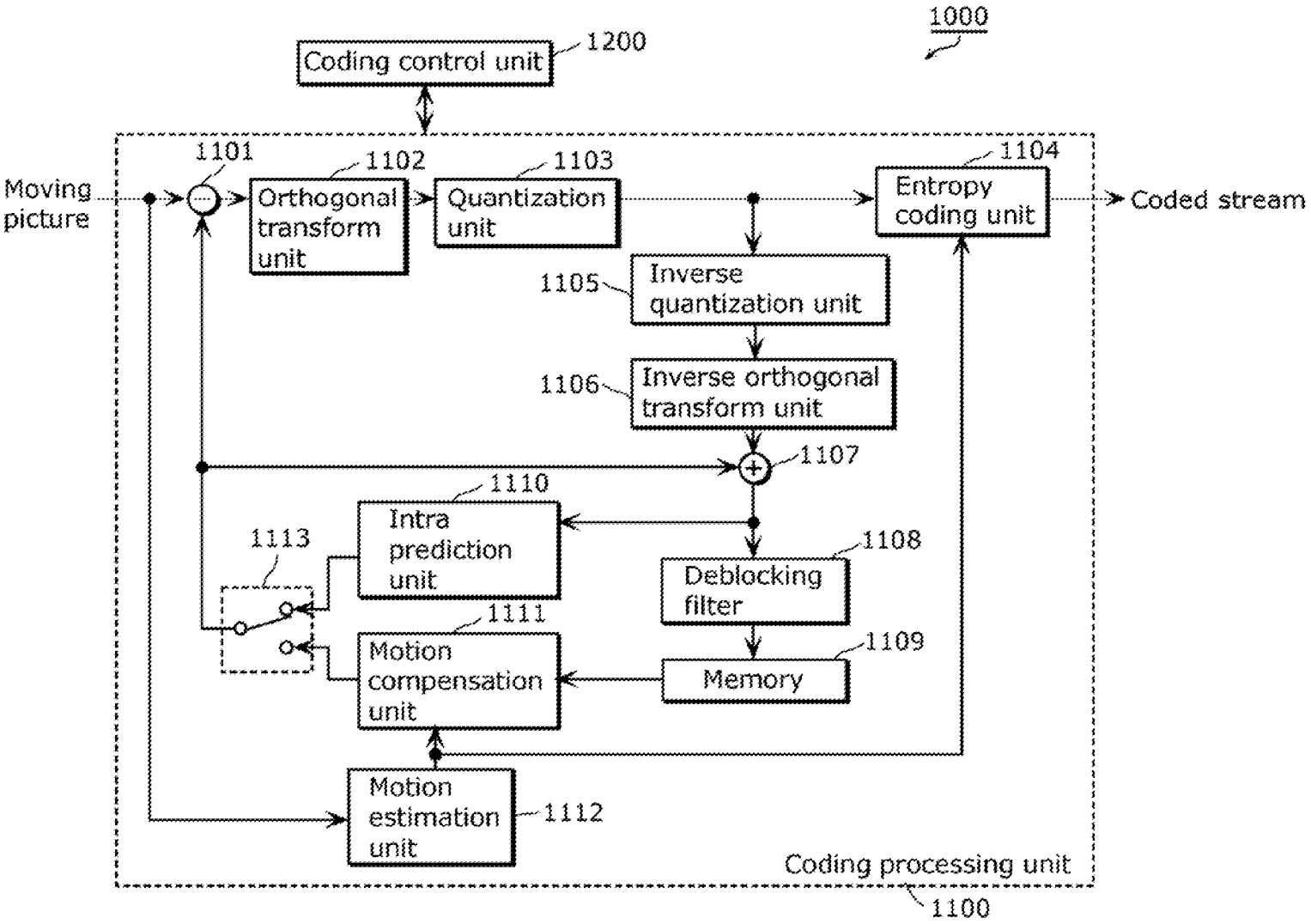
FIG. 2 is a block diagram showing the configuration of an image coding apparatus according to Embodiment 1 of the present invention.

FIG. 2 is a block diagram showing the configuration of an image coding apparatus according to the present embodiment.

An image coding apparatus 1000 includes a coding processing unit 1100 and a coding control unit 1200.

The coding processing unit 1100 generates a coded stream by coding a moving picture on a block-by-block basis. The coding processing unit 1100 includes a subtractor 1101, an orthogonal transform unit 1102, a quantization unit 1103, an entropy coding unit 1104, an inverse quantization unit 1105, an inverse orthogonal transform unit 1106, an adder 1107, a deblocking filter 1108, a memory 1109, an intra prediction unit 1110, a motion compensation unit 1111, a motion estimation unit 1112, and a switch 1113.

The subtractor 1101 obtains a moving picture and a prediction image from the switch 1113. The subtractor 1101 subtracts the prediction image from the current block to be coded included in the moving picture, to generate a difference image.

The orthogonal transform unit 1102 performs orthogonal transform such as discrete cosine transform on the difference image generated by the subtractor 1101, to transform the difference image into a coefficient block comprising a plurality of frequency coefficients. The quantization unit 1103 quantizes each of the frequency coefficients included in the coefficient block, to generate quantized coefficient block.

The entropy coding unit 1104 generates coded stream by performing entropy coding (variable length coding) on the coefficient block quantized by the quantization unit 1103 and a motion vector estimation by the motion estimation unit 1112.

The inverse quantization unit 1105 performs inverse quantization of the coefficient block quantized by the quantization unit 1103. The inverse orthogonal transform unit 1106 generates a decoded difference image by performing inverse orthogonal transform such as inverse discrete cosine transform on each of the frequency coefficients included in the inversely quantized coefficient block.

The adder 1107 generates a locally decoded image by obtaining a prediction image from the switch 1113 and by adding the prediction image and the decoded difference image which is generated by the inverse orthogonal transform unit 1106.

The deblocking filter 1108 removes block distortion of the locally decoded image generated by the adder 1107 and stores the locally decoded image in the memory 1109.

The intra prediction unit 1110 generates a prediction image by performing intra prediction on the current block to be coded using the locally decoded image generated by the adder 1107.

The motion estimation unit 1112 estimates a motion vector for the current block to be coded included in the moving picture, and outputs the estimated motion vector to the motion compensation unit 1111 and the entropy coding unit 1104.

The motion compensation unit 1111 performs motion compensation on the current block to be coded by referring to the image stored in the memory 1109 as a reference image and by using the motion vector estimated by the motion estimation unit 1112. The motion compensation unit 1111 generates, by the motion compensation, a prediction image with respect to the current block to be coded.

When intra predictive coding is performed on the current block to be coded, the switch 1113 outputs the prediction image generated by the intra prediction unit 1110 to the subtractor 1101 and the adder 1107. When inter predictive coding is performed on the current block to be coded, the switch 1113 outputs the prediction image generated by the motion compensation unit 1111 to the subtractor 1101 and the adder 1107.

The coding control unit 1200 controls the coding processing unit 1100. More specifically, the coding control unit 1200 determines a processing unit in which a reference index is stored and hierarchy depth information for identifying the location of the processing unit. The reference index is an index used for inter prediction (motion estimation and motion compensation) by the motion compensation unit 1111 and the motion estimation unit 1112. The processing units according to the present embodiment are layered, and one of the processing units at any hierarchical layer corresponds to the above described block. The hierarchy depth information, for example, is a parameter for identifying the hierarchical layer having a processing unit in which a reference index is stored. The coding control unit 1200 instructs the entropy coding unit 1104 to store a reference index in the above determined processing unit and to store the hierarchy depth information in the header of the coded stream (for example, sequence header or picture header).

Figure 3:
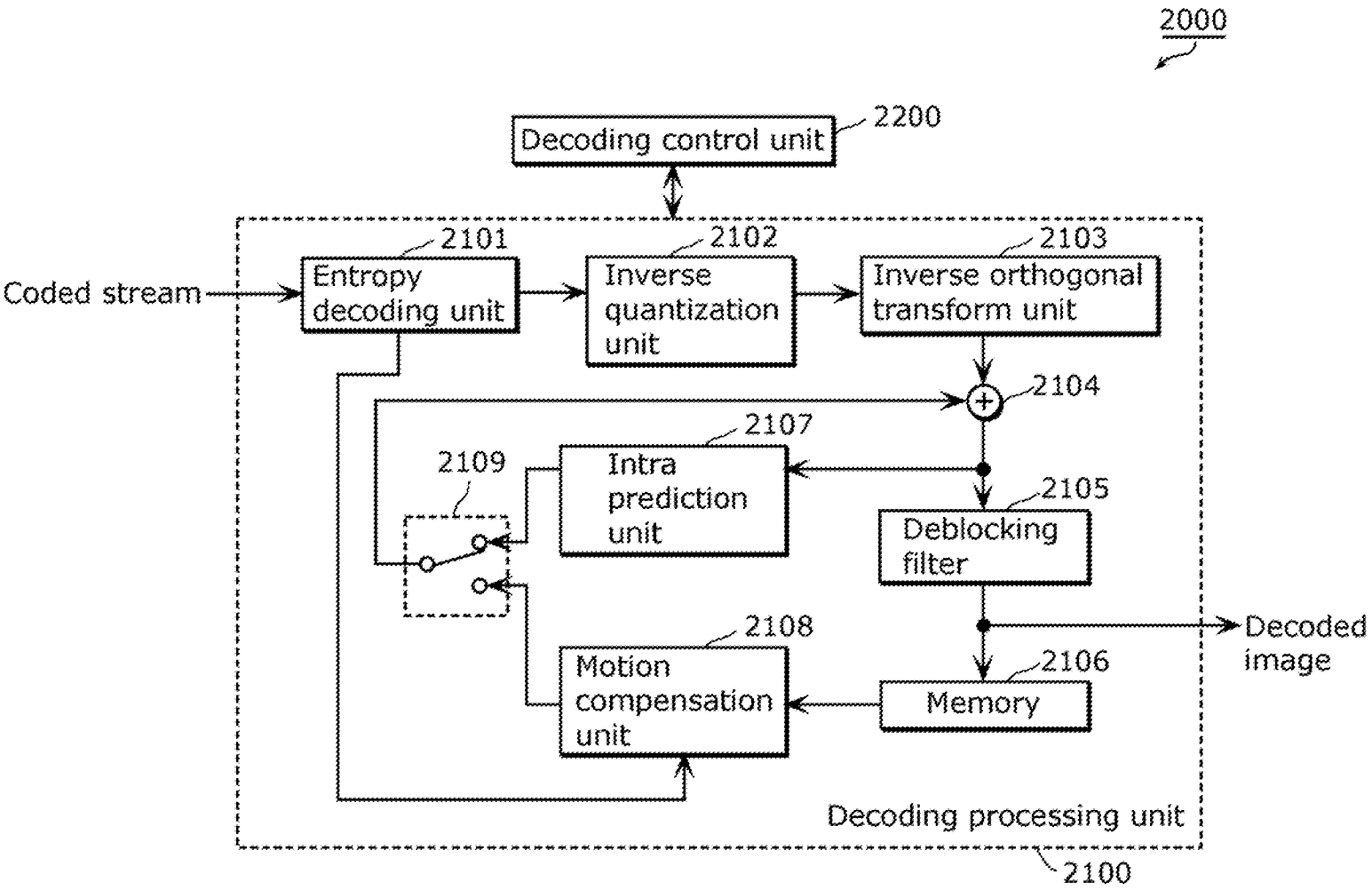
FIG. 3 is a block diagram showing the configuration of an image decoding apparatus according to Embodiment 1 of the present invention.

FIG. 3 is a block diagram showing a configuration of an image decoding apparatus according to the present embodiment.

An image decoding apparatus 2000 includes a decoding processing unit 2100 and a decoding control unit 2200.

The decoding processing unit 2100 generates a decoded image by decoding a coded stream on a block-by-block basis. The decoding processing unit 2100 includes an entropy decoding unit 2101, an inverse quantization unit 2102, an inverse orthogonal transform unit 2103, an added 2104, a deblocking filter 2105, a memory 2106, an intra prediction unit 2107, a motion compensation unit 2108, and a switch 2109.

The entropy decoding unit 2101 obtains a coded stream and performs entropy decoding (variable length decoding) on the coded stream.

The inverse quantization unit 2102 performs inverse quantization on the quantized coefficient block generated by entropy decoding by the entropy decoding unit 2101. The inverse orthogonal transform unit 2103 generates a decoded difference image by performing inverse orthogonal transform such as inverse discrete cosine transform on each of the frequency coefficient included in the inversely quantized coefficient block.

The adder 2104 generates a decoded image by obtaining a prediction image from the switch 2109 and by adding the prediction image and the decoded difference image which is generated by the inverse orthogonal transform unit 2103.

The deblocking filter 2105 removes block distortion of the decoded image generated by the adder 2104, stores the decoded image in the memory 2106, and outputs the decoded image.

The intra prediction unit 1110 generates a prediction image by performing intra prediction on the current block to be decoded using the decoded image generated by the adder 2104.

The motion compensation unit 2108 performs motion compensation on the current block to be decoded by referring to the image stored in the memory 2106 as a reference image and by using the motion vector generated by entropy decoding by the entropy decoding unit 2101. The motion compensation unit 2108 generates, by the motion compensation, a prediction image with respect to the current block to be decoded.

When intra predictive coding is performed on the current block to be decoded, the switch 2109 outputs the prediction image generated by the intra prediction unit 2107 to the adder 2104. When inter predictive coding is performed on the current block to be decoded, the switch 2109 outputs the prediction image generated by the motion compensation unit 2108 to the adder 2104.

The decoding control unit 2200 controls the decoding processing unit 2100. More specifically, the decoding control unit 2200 parses the hierarchy depth information stored in the header of the coded stream (for example, sequence header or picture header), based on the result of the entropy decoding by the entropy decoding unit 2101. The decoding control unit 2200 identifies, based on the hierarchy depth information, the hierarchical layer have a processing unit in which a reference index is stored and parses the reference index included in the processing unit in the hierarchical layer. The decoding control unit 2200 instructs the motion compensation unit 2108 to perform inter prediction (motion compensation) using the parsed reference index.

Figure 4:
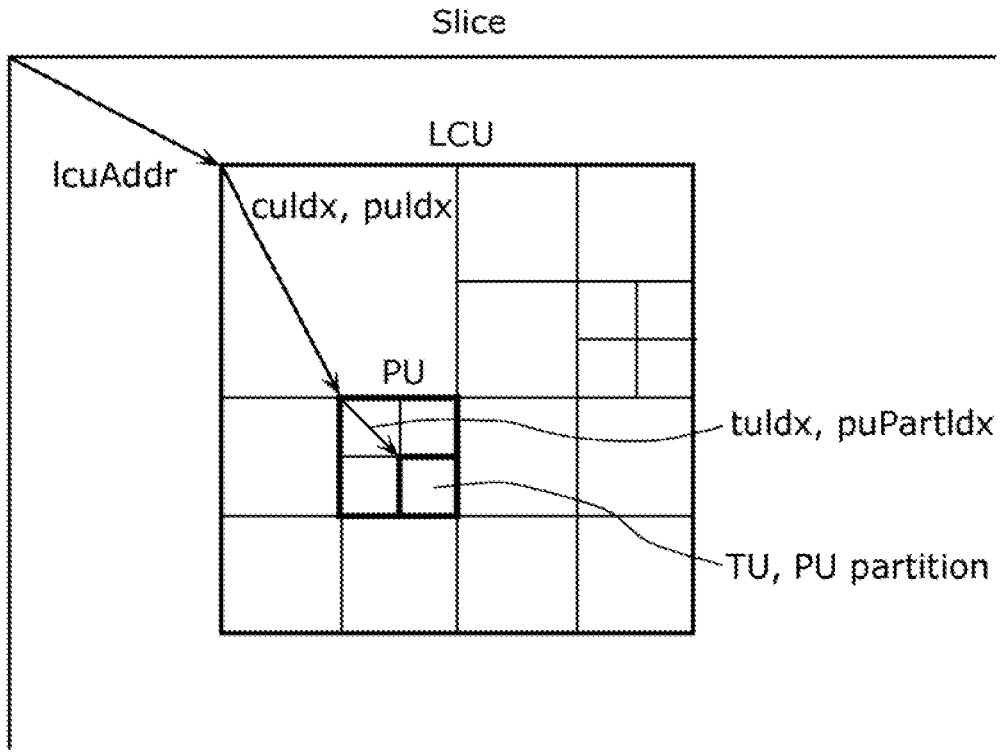
FIG. 4 is an illustration diagram for describing a multi-hierarchical block structure.

FIG. 4 is an illustration diagram for describing a layered processing unit (multi-hierarchical block structure).

The coding processing unit 1100 performs coding on the moving picture for each of the processing units, and the decoding processing unit 2100 decodes the coded stream for each of the processing units. The processing unit is divided into small processing units, and the processing units are layered such that each of the processing units is divided into smaller processing units. It should be noted that when the processing unit is smaller, the hierarchical layer in which the processing unit exists is deeper and lower and the value showing the hierarchical layer is greater. In contrast, when the processing unit is greater, the hierarchical layer in which the processing unit exists in shallow and is in high order and the value showing the hierarchical layer is small.

The processing unit includes a coding unit (CU), a prediction unit (PU), and a transform unit (TU). CU is a block of maximum 128×128 pixels, and is a unit which corresponds to the conventional macroblock. PU is a basic unit for inter prediction. TU is a basic unit for orthogonal transform, and the size of TU is the same as the size of the PU or is smaller than the size of the PU by one hierarchical layer. CU is, for example, divided into four sub CUS, and one of the sub CUs includes the PU and the TU of the same size as the sub CU (in this case, PU and TU are overlapping with each other). For example, the PU is further divided into four sub PUs, and TU is also further divided into four sub TUs. It should be noted that when the processing unit is divided into small processing units, the small processing unit is referred to as a sub-processing unit. For example, when the processing unit is CU, the sub-processing unit is a sub CU. When the processing unit is PU, the sub-processing unit is a sub PU. When the processing unit is TU, the sub-processing unit is a sub TU.

The detail is as follows.

Pictures are divided into slices. A slice is a sequence of largest coding unit. Location of largest coding unit is specified by the largest coding unit address leuAddr.

Each coding unit including the largest coding unit is divided into four coding units recursively. It results to the quadtree segmentation of the largest coding unit. Location of coding unit is specified by the coding unit index culdx which designates, as a starting point, the upper-left sample of the largest coding unit (pixel or coefficient).

Once the coding unit is not allowed to be split, it shall be considered as the prediction unit. Similar to the coding unit, location of prediction unit is specified by the prediction unit index puldx which designates, as a starting point, the upper-left sample of the largest coding unit.

The prediction unit may include a plurality of partitions (prediction unit partition or sub PU). The prediction unit partition is specified by prediction unit partition index puPartIdx which designates, as a starting point, the upper-left sample of the prediction unit.

The prediction unit may include a plurality of transform units. Similar to the coding unit, transform unit may be divided into four small site transform units (sub transform units). This allows quadtree segmentation of the residual signal. Location of the transform unit is specified by the transform unit index tuIdx which designates, as a starting point, the upper-left sample of the prediction unit.

Here, the definitions of the processing units are as follows.

coding tree block (CTB); A basic unit for specifying the quadtree segmentation of the given square region. CTB can have various sizes of a square shape.

largest coding tree block (LCTB): Coding tree block of the largest size allowed in the slice. A slice consists of non-overlapped LCTBs.

smallest coding tree block (SCTB): Coding tree block of the smallest size allowed in the slice. SCTB is not allowed to be split into smaller CTBs.

prediction unit (PU): A basic unit for identifying the prediction process. The size of PU is the same to that of the CU which is not allowed to be split any more. PU can be split into multiple partitions which may have arbitrary shapes whereas CU is allowed to be split into four square shapes.

transform unit (TU): A basic unit for identifying transform and quantization process.

coding unit (CU): Same as coding tree block.

largest coding unit (LCU): Same as largest coding tree block.

smallest coding unit (SCU): Same as smallest coding tree block.

Figure 5:
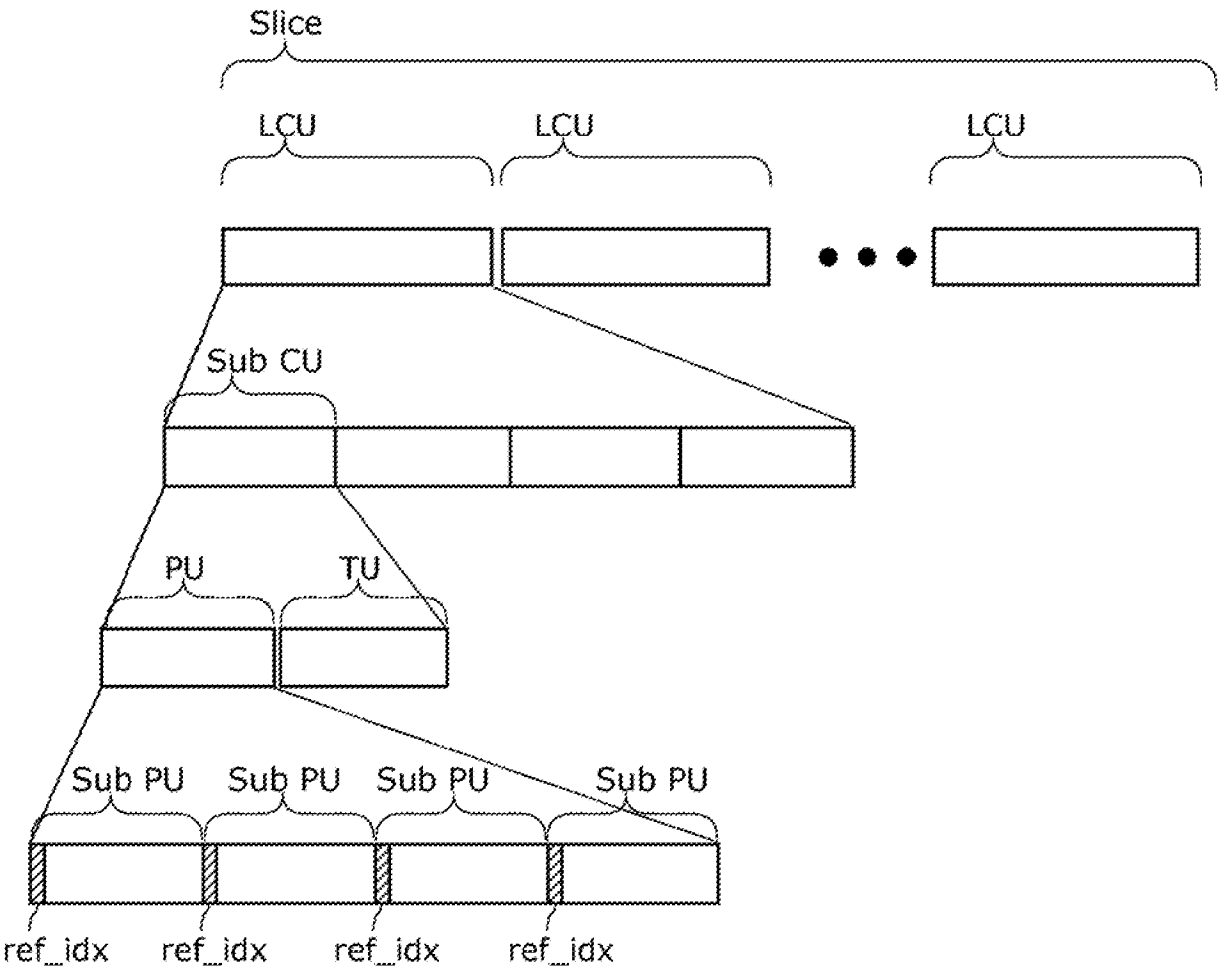
FIG. 5 is a diagram showing configuration a coded stream being considered under HEVC standard.

FIG. 5 is a diagram showing a configuration a coded stream being considered under HEVC standard.

In a coded stream being considered under the HEVC standard, a reference index is stored at each of the PUs. For example, as shown in FIG. 5, LCU is divided into four sub CUs, and each of the sub CUs has PU and TU. The PU is further divided into four sub PUs. In this case, a reference index (ref_idex) is stored at each of the four sub PUs. In other words, the image coding apparatus always has to transmit the reference index to the image decoding apparatus on a PU-by-PU basis. As a result, an overhead is increased. In other words, the amount of coding of a coded stream is large and coding efficiency is reduced.

Therefore, in the coded stream generated by the image coding apparatus 1000 and decoded by the image decoding apparatus 2000 according to the present embodiment, the reference index common to the processing unit is stored in the processing unit which is located at a higher hierarchical layer that is shallower than the lowest PU.

Figure 6:
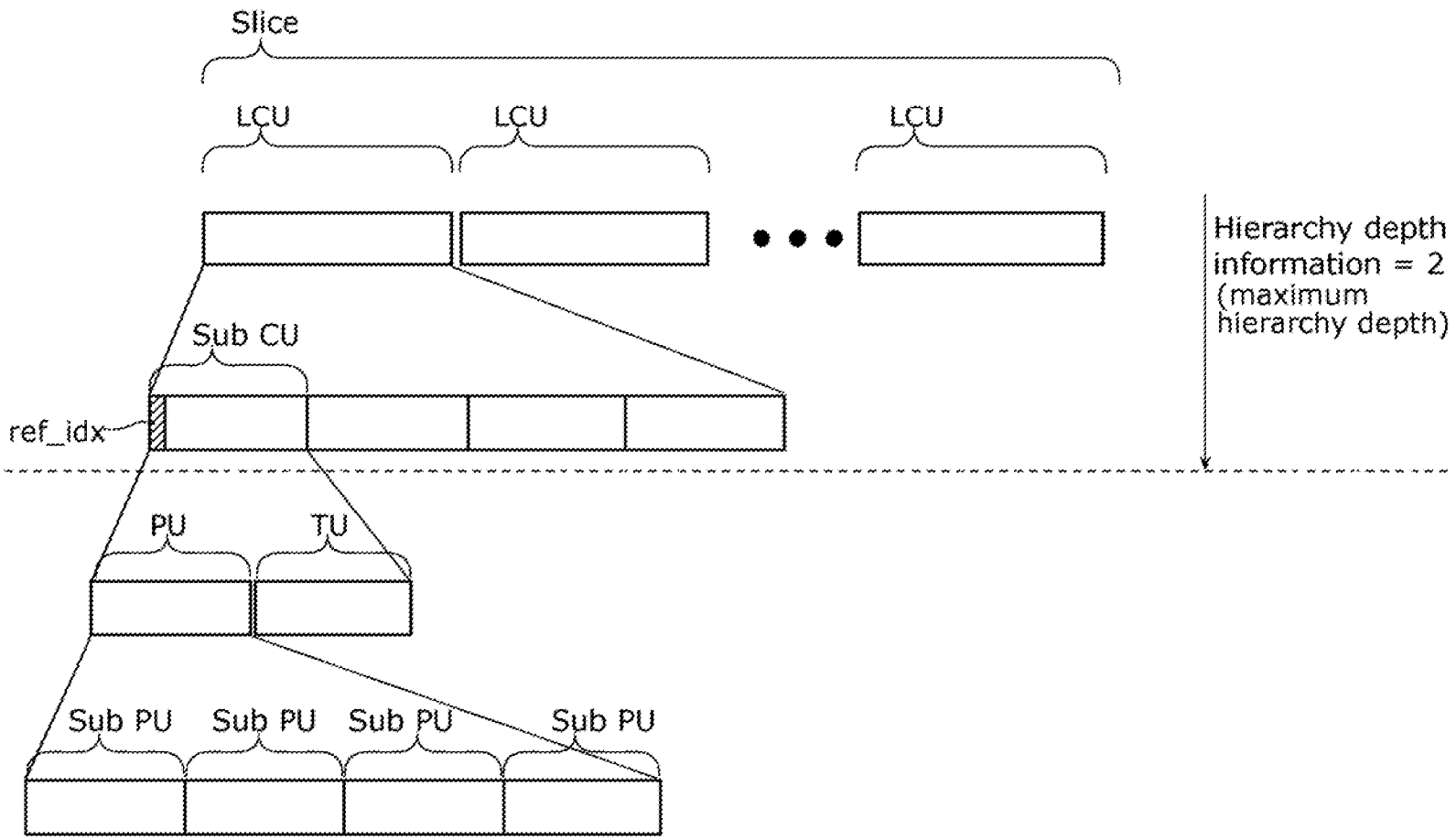
FIG. 6 is a diagram showing the configuration of a coded stream according to Embodiment 1 of the present invention.

FIG. 6 is a block diagram showing a configuration of a coded stream according to the present embodiment.

In the coded stream, for example, as shown in FIG. 6, LCU is divided into four sub CUs, and each of the sub CUs has PU and TU. The PU is further divided into four sub PUs. In this case, in the coded stream according to the present embodiment, the reference index (ref_idx) is not stored at the lowest sub PU, and the reference index common to the sub PUs is stored at the sub CU which is located at, fin example, a higher hierarchical layer that is shallower than the sub PU. With this, its the present embodiment an overhead can be reduced and coding, efficiency can be increased.

It should be noted that the reference index to be stored in the sub CU does not have to be a reference index common to each of the sub PUs included in the sub CU, and may be a set of four reference indexes for each el the sub PUs. With this, since the reference indexes each for the sub PUs are stored in the same place as a whole, it is easier for the image decoding apparatus 2000 to perform decoding process. Moreover, the position in which the reference index is stored in the processing unit (sub CU) may be the head or the tail of the processing unit.

Furthermore, in the coded stream according to the present embodiment, the hierarchy depth information (maximum hierarchy depth) indicating the hierarchical layer of the lowest processing unit in which the reference index is stored is stored in a header such as a sequence header. For example, maximum hierarchy depth=2.

The image coding apparatus 1000 generates and outputs the coded stream. Meanwhile, the image decoding apparatus 2000 identities the processing unit in which the reference index is stored (sub CU located at the second hierarchical layer) by parsing the hierarchy depth information (maximum hierarchy depth) stored in a header such as a sequence header of the coded stream, and parses the reference index stored in the processing unit. Then, the image decoding apparatus 2000 performs inter prediction by applying the reference index to the PUs included in the sub CU which stores the reference index.

Figure 7A:
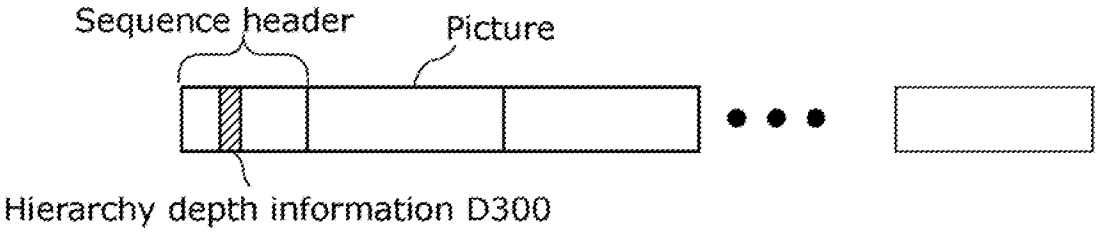
FIG. 7A is a diagram showing a storage position of hierarchy depth information (maximum hierarchy depth) according to Embodiment 1 of the present invention.
Figure 7B:
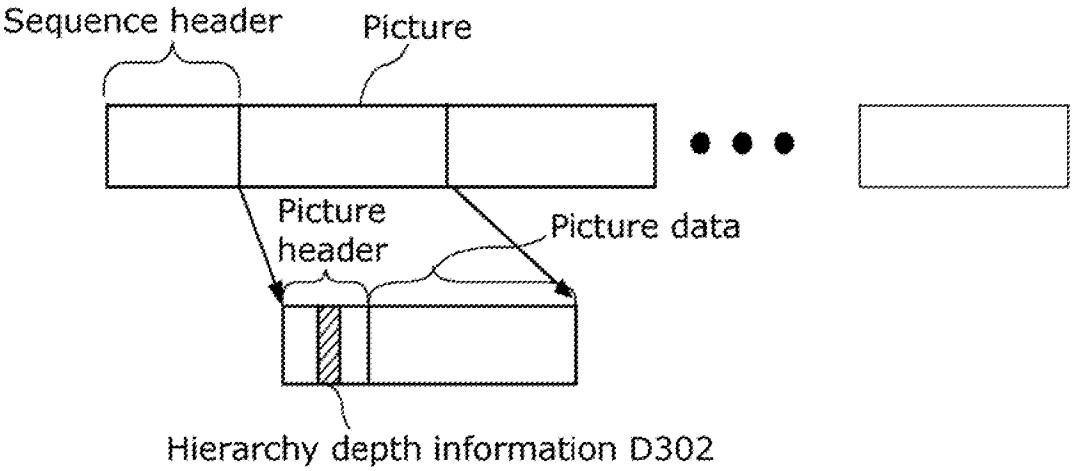
FIG. 7B is a diagram showing a storage position of hierarchy depth information (maximum hierarchy depth) according to Embodiment 1 of the present invention.

FIG. 7A and FIG. 7B are each a diagram showing the storage position of hierarchy depth information (maximum hierarchy depth).

As shown in FIG. 7A, hierarchical depth information (maximum hierarchy depth) D300 is stored in a sequence header. As shown in FIG. 7B, hierarchy depth information (maximum hierarchy depth) D302 is stored in a picture header.

Figure 8:
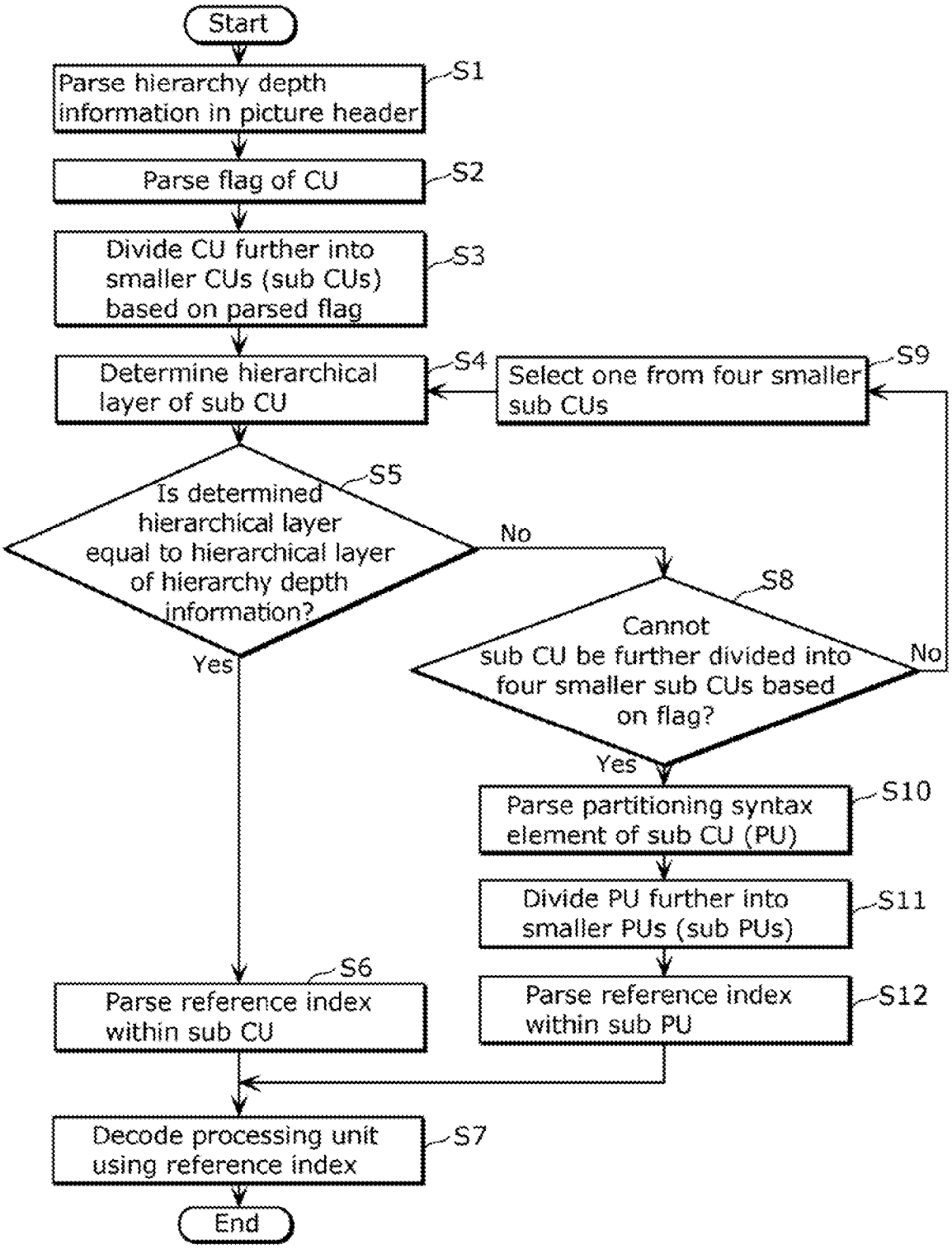
FIG. 8 is a flowchart showing decoding by an image decoding apparatus according to Embodiment 1 of the present invention.

FIG. 8 is a flowchart showing decoding by an image decoding apparatus 2000 according to the present embodiment.

The image decoding apparatus 2000 first parses hierarchy depth information (maximum hierarchy depth) stored in the picture header (Step S1), and parses a flag of the CU (Step S2). Next, the image decoding apparatus 2000 divides the CU into sub CUs that are smaller than the CU, based on the parsed flag (Step S3). Then, the image decoding apparatus 2000 determines hierarchical layer of the sub CU (Step S4), and determines whether or not the determined hierarchical layer matches the hierarchical layer indicated by hierarchy depth information (maximum hierarchy depth) (Step S5).

When it is determined that the determined hierarchical layer matches the hierarchical layer indicated by hierarchy depth information (Yes in Step S5), the image decoding apparatus 2000 parses the reference index stored in the sub CU (Step S6) and then decodes the processing unit that is the sub CU by performing inter prediction using the parsed reference index (Step S7).

Meanwhile, it is determined in Step S5 that the determined hierarchical layer fails to match the hierarchical layer indicated by hierarchy depth information (No in Step S5), the image decoding apparatus 2000 determines whether or not the sub CU cannot be further divided into four smaller sub CUs, based on the parsed flag (Step S8). When it is determined that the sub CU can be further divided into four smaller sub CUs (No in Step S8), the image decoding apparatus 2000 selects any one sub CU from the four smaller sub CUs (Step S9), and then performs the processes from Step S4 on the selected sub CU.

Meanwhile, when it is determined in Step S8 that the sub CU cannot be further divided into four smaller sub CUs (Yes in Step S8), the image decoding apparatus 2000 parses partitioning syntax element of the sub CU, that is to say, the PU (Step S10). The partitioning syntax element shows the total number of the sub PUs and the of the sub PU when the PU is divided into a plurality of sub PUs. Furthermore, the image decoding apparatus 2000 divides the sub CU, that is to say, PU into smaller PUs (sub PUs), based on the parsed partitioning syntax element (Step S11). Then, the image decoding apparatus 2000 parses the reference indexes each for the sub PU (Step S12), and then performs the process of Step S7.

Figure 9:
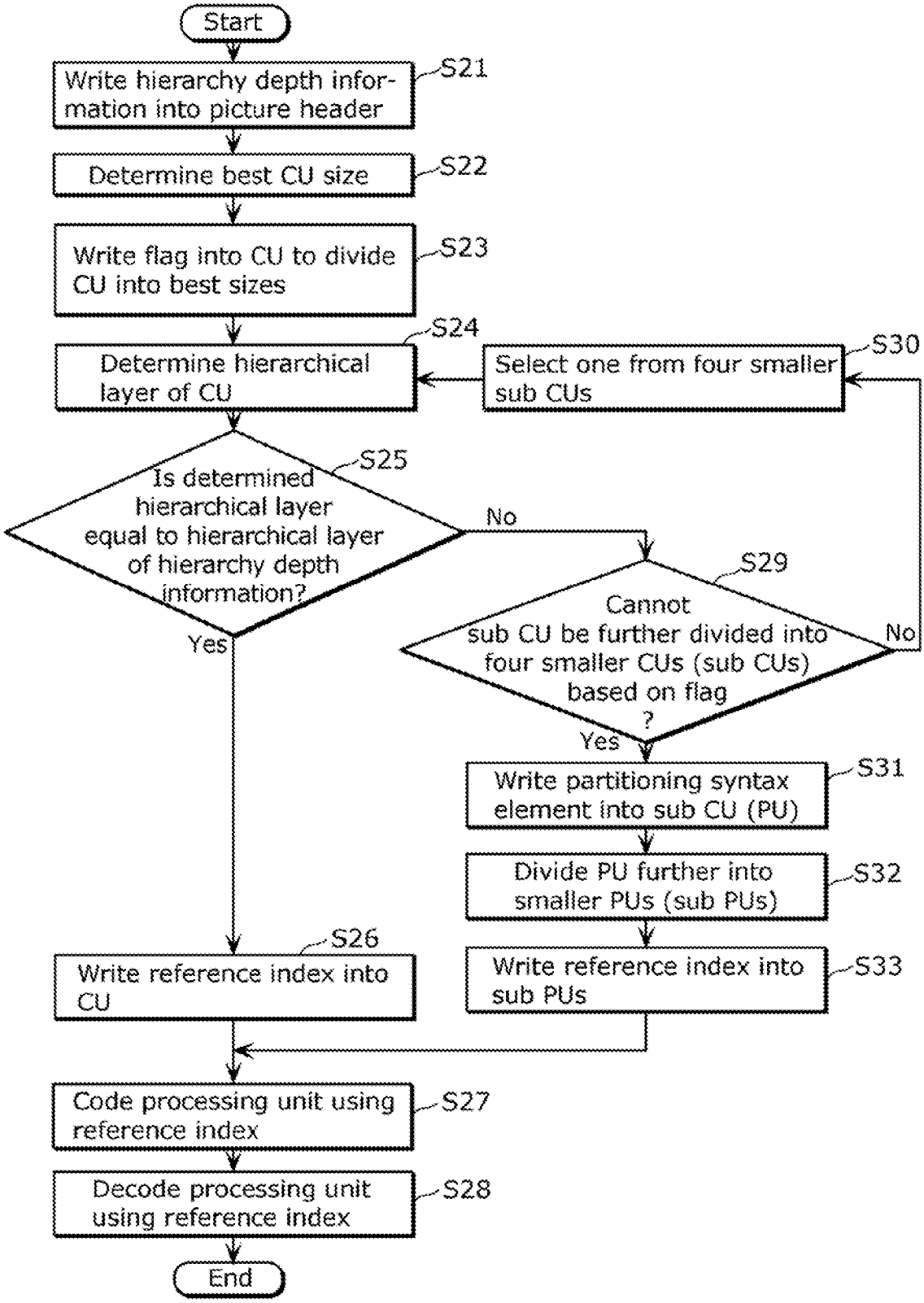
FIG. 9 is a flowchart showing coding by an image coding apparatus according to Embodiment 1 of the present invention.

FIG. 9 is a flowchart showing coding by the image coding apparatus 1000 according to the present embodiment.

The image coding apparatus 1000 first writes hierarchy depth information (maximum hierarchy depth) into a picture header (Step S21), and determines the best size for dividing the CU (Stop S22). Next, the image coding apparatus 1000 writes, into the CU, flag for dividing the CU into the processing units of the determined sizes (Step S23), Then, the image coding apparatus 1000 determines the hierarchical layer of the processing unit to be coded (CU or sub CU) (Step S24), and then determines whether or not the determined hierarchical layer matches the hierarchical layer indicated by the previously written hierarchy depth information (maximum hierarch depth) (Step S25).

When it is determined that the determined hierarchical layer matches the previously written hierarchy depth information (Yes in Step S25), the image coding apparatus 1000 writes the reference indexes into the processing unit (CU or sub CU) (Step S26) and then codes the processing unit by performing inter prediction using the written reference indexes (Step S27). Furthermore, the image coding apparatus 1000 decodes the coded processing unit by performing inter prediction using the written reference indexes (Step S28).

Meanwhile, it is determined in Step S25 that the determined hierarchical layer fails to match the previously written hierarchy depth information (No in Step S25), the image coding apparatus 1000 determines whether or not the processing unit cannot be further divided into four smaller sub CUs, based on the parsed flag (Step S29). When it is determined that the processing unit can be further divided into four smaller sub CUs (No in Step S29), the image coding apparatus 1000 selects any one sub CU from the four smaller sub CUs (Step S30), and then performs the processes from Step S24 on the selected sub CU.

Meanwhile, it is determined in Step S29 that the processing unit cannot be further divided into four smaller sub CUs (Yes in Step S29), the image coding apparatus 1000 writes partitioning syntax element into the processing unit (CU or sub CU), that is to say, the PU (Step S31). The partitioning syntax element shows the total number of the sub PUs and the size of the sub PU when the PU is divided into a plurality of sub PUs. Furthermore, the image coding apparatus 1000 divides the processing unit, that is to say, the PU into smaller PUs (sub PUs), based on the written partitioning syntax element (Step S32). Then, the image coding apparatus 1000 writes the reference index into each of the sub PUs (Step S33), and then performs the processes from Step S27.

As described above, the image coding apparatus 1000 according to the present embodiment transmits hierarchy depth information (maximum hierarchy depth) by including it in a header such as a picture header. Then, when the hierarchical layer of the lowest CU (sub CU) is higher than the hierarchical layer indicated by maximum hierarchy depth, the image coding apparatus 1000 individually transmits the reference index corresponding to reach PU included in the CU (sub CU). When the hierarchical layer of the lowest CU (sub CU) is equal to the hierarchical layer indicated by maximum hierarchy depth or deeper than the hierarchical layer indicated by maximum hierarch depth, the image coding apparatus 1000 transmits combined ref_idx in association with the CU (sub CU) of the hierarchical layer indicated by maximum hierarchy depth. The combined ref_idx is a reference index to be applied to all PUs included in the CU (sub CU).

It should be noted that when the hierarchical layer of the lowest CU is deeper than or equal to the hierarchical layer indicated by maximum hierarchy depth, the image coding apparatus 1000 according to the present embodiment, as described above, writes the reference index into the CU (sub CU) of the hierarchical layer indicated by maximum hierarchy depth, but may write the reference index into the CU (sub CU) located higher than the hierarchical layer. In this case, the image decoding apparatus 2000 parses the reference index stored in the CU (sub CU) located higher than the hierarchical layer indicated by the maximum hierarchy depth.

As described above, in the image coding method according to the present embodiment, by not repeatedly writing the same reference index into a plurality of small prediction units, only one reference index is written into a large processing unit which is located at a higher hierarchical layer than the prediction units and includes the prediction units. Therefore, the redundancy of the reference index can be removed and coding efficiency can be increased. Moreover, since the image decoding apparatus 2000 identifies the hierarchical layer having the processing unit in which the reference index is stored, by parsing hierarchy depth information, the image decoding apparatus 2000 can reduce the processing load of searching the processing unit in which the reference index is stored and can appropriately decode a coded stream generated by the image coding apparatus 1000.

[Variation 1]

An image coding apparatus 1000 according to Variation1 of the present embodiment sends the first flag by including it in a header such as a picture header. The first flag shows whether or not combined ref_idx is stored in the lowest CU (sub CU). In other words, the image coding apparatus 1000 sends combined ref_idx in association with the CU (sub CU) when the storage of combined ref_idx is indicated by the first flag. In other words, independently of the size of the CU (sub CU), combined ref_idx common to all the PUs included in the CU (sub CU) is sent. Meanwhile, when the storage of combined ref_idx is not indicated by the first flag, the image coding apparatus 1000 individually sends the reference index corresponding to each of the PUs included in the CU (sub CU). In other words, independently of the size for each of the PUs, an individual reference index for each of the PUs is sent.

Figure 10:
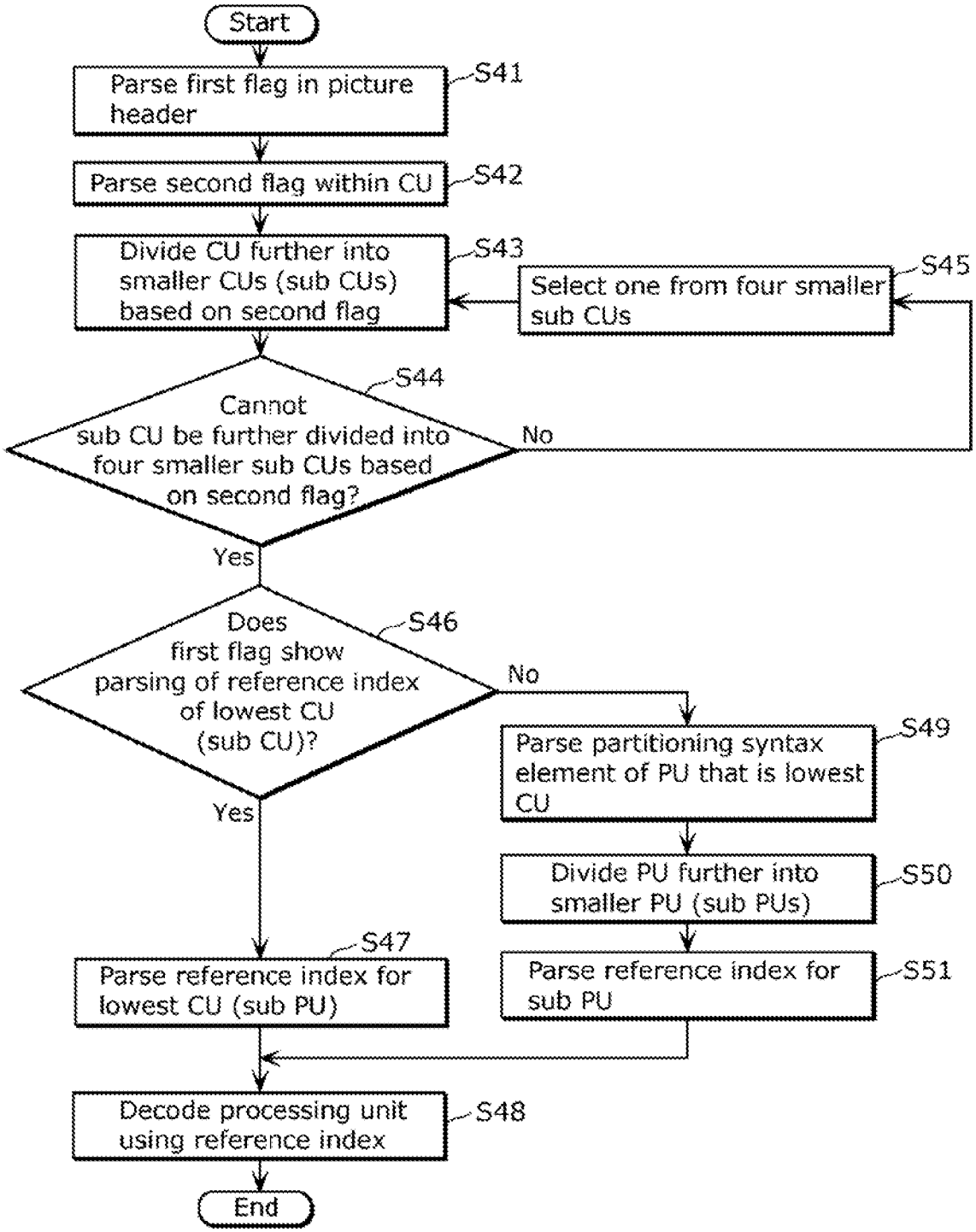
FIG. 10 is a flowchart showing decoding by an image decoding apparatus according to Variation 1 of Embodiment 1 of the present invention.

FIG. 10 is a flowchart showing decoding by the image decoding apparatus 2000 according to Variation 1 of the present embodiment.

The image decoding apparatus 2000 that parses the first flag stored in a picture header (Step S41), and farther parses the second flag stored in the CU (Step S42). Next, the image decoding apparatus 2000 divides the CU into sub CUs that are smaller than the CU, based on the parsed second flag (Step S43). Then, the image decoding apparatus 2000 determines whether or not the sub CU cannot be further divided into four smaller sub CUs, based on the parsed second flag (Step S44). When it is determined that the sub CU can be further divided into four smaller sub CUs (No in Step S44), the image decoding apparatus 2000 selects any one sub CU from the four smaller sub CUs (Step S45), and then performs the processes from Step S43 on the selected sub CU. Meanwhile, when it is determined that the sub CU cannot be further divided into four smaller sub CUs (Yes in Step S44), the image decoding apparatus 2000 further determines whether or not the first flag parsed in Step S41 indicates parsing of the reference index in the lowest CU (sub CU) (Step S46).

When it is determined that the first flag indicates parsing of the reference index in the lowest. CU (sub CU) (Yes in Step S46), the image decoding apparatus 2000 parses the reference index for the lowest CU (sub CU) (Step S47) and decodes the processing unit that is the CU (sub CU) by performing inter prediction using the parsed reference index (Step S48).

Meanwhile, when it is determined in Step S46 that the first flag fails to indicate parsing of the reference index in the lowest CU (sub CU) (No in Step S46), the image decoding apparatus 2000 parses partitioning syntax element orate lowest CU (sub CU), that is to say, PU (Step S49). The partitioning syntax element shows the total number of the sub PUs and the size of the sub PU when the PU is divided into a plurality of sub PUs. Furthermore, the image decoding apparatus 2000 divides the lowest CU (sub CU), that is to say, the PU into PUs that are smaller than the PU (sub PUs), based on the parsed partitioning syntax element (Step S50). Then, the image decoding apparatus 2000 parses the reference indexes each for the sub PU (Step S51), and then performs the process of Step S48.

[Variation 2]

The image coding apparatus 1000 according to the above described embodiment stores reference indexes to be applied to the sub PUs, in a processing unit located in a higher hierarchical layer (for example, CU or sub CU) including a plurality of sub PUs. Moreover, the image decoding apparatus 2000 according to the above described embodiment parses reference index stored in the processing, unit located in the higher hierarchical layer, and applies the reference index to the above described PUs.

Conversely, an image coding apparatus 1000 according to the present variation stores the reference index to be applied to the sub PUs, in a processing unit located in a higher hierarchical layer including a plurality of sub PUs, and stores adaptive motion vector resolution switch flag (also referred to as Motion Vector Resolution Flag, mvres, MVres, or MVRes). Moreover, the image decoding apparatus 2000 according to the present variation parses the reference index and adaptive motion vector resolution switch flag, and applies the reference index and the adaptive motion vector resolution switch flag to the above described sub PUs.

It should be noted that the adaptive motion vector resolution switch flag is a flag for switching the motion vector resolution between ⅛ pixel resolution and ¼ pixel resolution.

Figure 11:
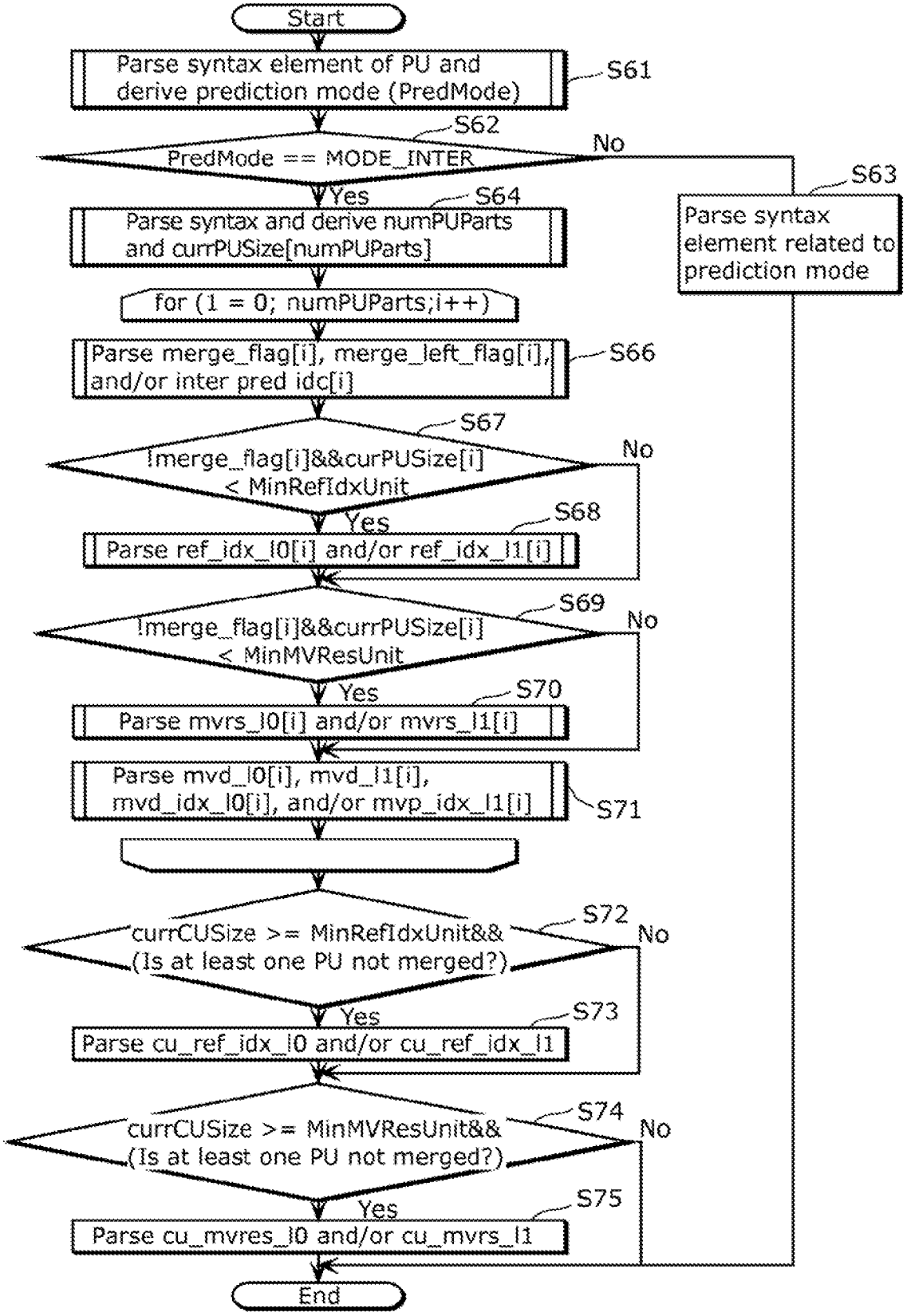
FIG. 11 is a flowchart showing decoding of PU by an image decoding apparatus according to Variation 2 of Embodiment 1 of the present invention.

FIG. 11 is a flowchart showing decoding of PU by the image decoding apparatus 2000 according to the present variation.

First, the image decoding apparatus 2000 parses syntax elements of PU and derives a prediction mode (Step S61). Then, the image decoding apparatus 2000 determines whether or not the prediction mode is inter prediction (Step S62). When it is determined that the prediction mode is not inter prediction (No in Step S62), the image decoding apparatus 2000 parses syntax element related to the prediction mode (Step S63). Meanwhile, it is determined that the prediction mode is inter prediction (Yes in Step S62), the image decoding apparatus 2000 parses the syntax and derives the total number of PUs (sub PUs) included in the PU (numPUParts) and the sizes of the PUs (currPUSize [numPUParts]) (Step S64).

Next, the image decoding apparatus 2000 performs the processes of Steps S66 to S71 on each of the derived number of PUs. More specifically, the image decoding apparatus 2000 parses merge flag (merg_flag[i], merge_left_flag[i]) and/or inter_pred_ide[i] (Step S66), and determines whether or not PU is not merged (PU cannon be further divided) and the size of PU is smaller than MinRefldxUnit (Step S67). When it is determined that the PU is not merged and the size of PU is smaller than MinRefldxUnit (Yes in Step S67), the image decoding apparatus 2000 parses the reference indexes (ref_idx_10[i], ref_idx_11[i]) stored in the PU (Step S68). Furthermore, the image decoding apparatus 2000 determines whether or not the PU is not merged and the size of PU is smaller than MinMVResUnit (Step S69). When it is determined that the PU is not merged and the size of PU is smaller than MinMVResUnit (Yes in Step S69), the image decoding apparatus 2000 parses the adaptive motion vector resolution switch flag (mvres_10[i], mvres_11[i]) stored in the PU (Step S70). Furthermore, the image decoding apparatus 2000 parses a difference motion vector (mvd_10[i], mvd_11 [i]) and mvp_idx (mvp_idx_10[i], mvp_idx_11[i]) (Step S71).

Next, the image decoding apparatus 2000 determines whether or not the size of the CU to be decoded (currCU-Size) is larger than or equal to MinRefldxUnit and at least one PU is not merged (Step S72). When it is determined that the size of CU to be decoded is larger than or equal to MinRefldxUnit and at least one PU is not merged (Yes in Step S72), the image decoding apparatus 2000 parses at reference index of the CU to be decoded (cu_ref_idx_10, cu_ref_idx_11) (Step S73). Furthermore, the image decoding apparatus 2000 determines whether or not the size of the CU to be decoded is larger than or equal to MinMVResUnit and at least one PU is not merged (Step S74). When it is determined that the size of the CU to be decoded is larger than or equal to MinMVResUnit and at least one CU is not merged (Yes in Step S74), the image decoding apparatus 2000 parses adaptive motion vector resolution switch flag of the CU to be decoded (cu_mvres_10, cu_mvres_11) (Step S75).

The image decoding method and the image coding method according to the present invention have been described using the above described embodiment and variations. However, the present invention is not defined only by these.

For example, the image decoding method according to the above described Embodiment 1 and the variation includes the processes of Steps S2 and S4, and the like in FIG. 8. However, the present invention can obtain the above described effect without the processes.

Figure 12A:
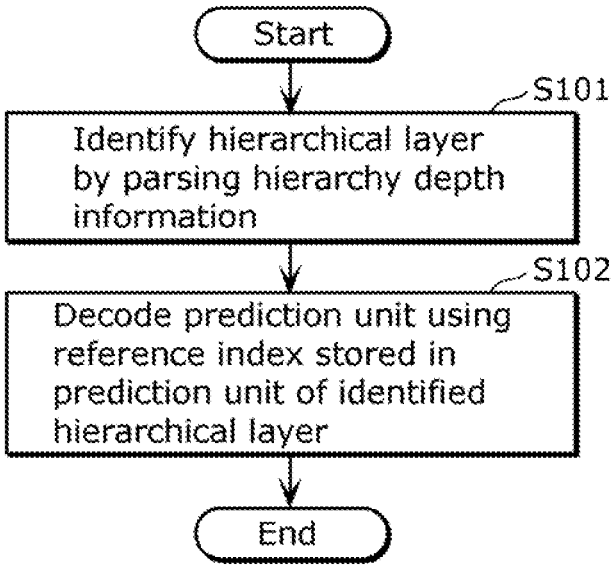
FIG. 12A is a flowchart showing the image decoding method according to the present invention.

FIG. 12A is a flowchart showing the image decoding method according to the present invention.

The image decoding method according to the present invention is an image decoding method for decoding a coded stream which includes a plurality of processing units and a header of the processing units, the coded stream being generated by coding a moving picture using inter prediction. Here, the processing units includes at least one processing unit divided into a plurality of sub processing units in a hierarchy which decrease in size from a higher level to a lower level, and the hierarchy includes: a highest hierarchical layer in which a coding unit exists as a largest processing unit; and a lower hierarchical layer which is deeper than the highest hierarchical layer and in which a prediction unit exists as a processing unit smaller than the coding unit. In the image decoding method, by parsing hierarchy depth information stored in the header and indicating a hierarchical layer higher than a lowest hierarchical layer in which a smallest prediction unit exits, a hierarchical layer is identified which is indicated by the hierarchy depth information or a hierarchical layer higher than the indicated hierarchical layer, the hierarchical layer having a prediction unit in which a reference index necessary for decoding is stored (Step S101) Next, the prediction unit is decoded using the reference index stored in the prediction unit in the identified hierarchical layer (Step S102).

By performing the processes of Steps S101 and S102, the same effect as that of Embodiment 1 can be obtained. The other processes are not essential for the present invention. Moreover, the image decoding apparatus according to the present invention can obtain the same effect as that of Embodiment 1 by including structural elements which perform the processes of Steps S101 and S102. The other structural elements are not essential for the present invention. It should be noted that in the image decoding apparatus 2000 according to Embodiment 1, the decoding processing unit 2200 perform the process of Step S101 and the decoding processing unit 2100 performs the process of Step S102.

Moreover, the image coding method according to the above described Embodiment 1 and the variation includes the processes of Step S22 and the like in FIG. 9. However, the present invention can obtain the above described effect without the processes.

Figure 12B:
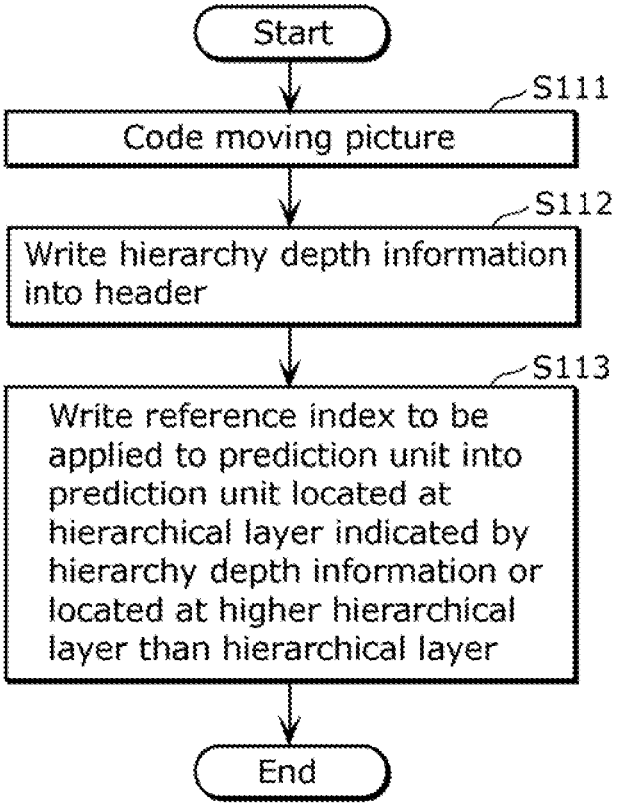
FIG. 12B is a flowchart showing the image coding method according to the present invention.

FIG. 12B is a flowchart showing the image coding method according to the present invention.

The image coding method according to the present invention is an image coding method for generating a coded stream which includes a plurality of processing units and a header of the processing units, by coding a moving picture using inter prediction. Here, the processing units includes at least one processing unit divided into a plurality of sub processing units in a hierarchy which decrease in size from a higher level to a lower level, and the hierarchy includes: a highest hierarchical layer in which a coding unit exists as a largest processing unit; and a lower hierarchical layer which is deeper than the highest hierarchical layer and in which a prediction unit exists as a processing unit smaller than the coding unit. In the image coding method, the moving picture is coded using inter prediction (Step S11). Next, hierarchy depth information which is information for identifying a hierarchical layer having a prediction unit in which a reference index necessary for decoding is stored and indicates a hierarchical layer higher than a lowest hierarchical layer in which a smallest prediction unit exists is written into the header (Step S112). Next, the reference index to be applied to the prediction unit is written into a prediction unit located at a hierarchical layer indicated by the hierarchy depth information or located higher than the indicated hierarchical layer. (Step S113)

By performing the processes of Steps S111 to S113, the same effect as that of Embodiment 1 can be obtained, The other processes are not essential for the present invention. Moreover, die imago coding apparatus according the present invention can obtain the same effects as that of Embodiment 1 by including structural elements which perform the processes of Steps S111 to S113. The other structural elements are not essential for the present invention. It should be noted that in the image coding apparatus 1000 according to Embodiment 1, the entropy coding unit 1104 performs the processes of Steps S111 to S113, based on the control by the coding control unit 1200.

It should be noted that a syntax of a header according to the present invention is shown in FIGS. 13A to 13C. The syntax of the processing unit according to the present invention (CU, PU, and TU) are shown in FIGS. 14A to 14C.

FIG. 13A is a diagram showing a syntax of a sequence header. In the sequence header, for example, the maximum number of reference frames that can be referred (max_num_ref_frames), the size of the picture (pic_width_in_luma_samples, pic_height_in_luma_samples), and the like are defined.

FIG. 13B is a diagram showing a syntax of a picture header. In the picture header, as shown in part d1 of the syntax, the number of reference indexes to be held for each reference direction (forward direction and backward direction) is defined, and an initial QP (number obtained by subtracting 26 from the initial QP) is defined.

FIG. 13C is a diagram showing, a syntax of a slice header. The slice header, as shown in part d2 the syntax, is configured such that the number of the above described reference indexes to be held can be rewritten for each slice. Moreover, the slice header, as shown in another part d3 of the syntax, defines the difference value of QP from the initial QP which is defined by the above described picture header.

FIG. 14A is a diagram showing a syntax of CU. In the CU, show in parts d4 and d5 of the syntax, PU and TU for the CU are defined.

FIG. 14B is a diagram showing a syntax of PU. The PU has, as shown in parts d6 and d8 of the syntax, a reference index for each reference direction, and has, as shown in other parts d7 and d9 of the syntax, adaptive motion vector resolution switch flag (mvres) for each reference direction.

FIG. 14C is a diagram showing a syntax of TU. The TU has, as shown in part d10 of the syntax, coefficients (transform coefficients) in which orthogonal transform and quantization are performed on the difference image.

Embodiment 2

The processing described in each of embodiments can be simply implemented in an independent computer system, by recording, in a recording medium, a program for implementing the configurations of the image coding method and the image decoding method described in each of embodiments. The recording media may be any recording media as long as the program can be recorded, such as a magnetic disk, an optical disk, as magnetic optical disk, an IC card, and a semi-conductor memory.

Hereinafter, the applications to the image coding method and the image decoding method described in each of embodiments and systems using thereof will be described.

Figure 15:
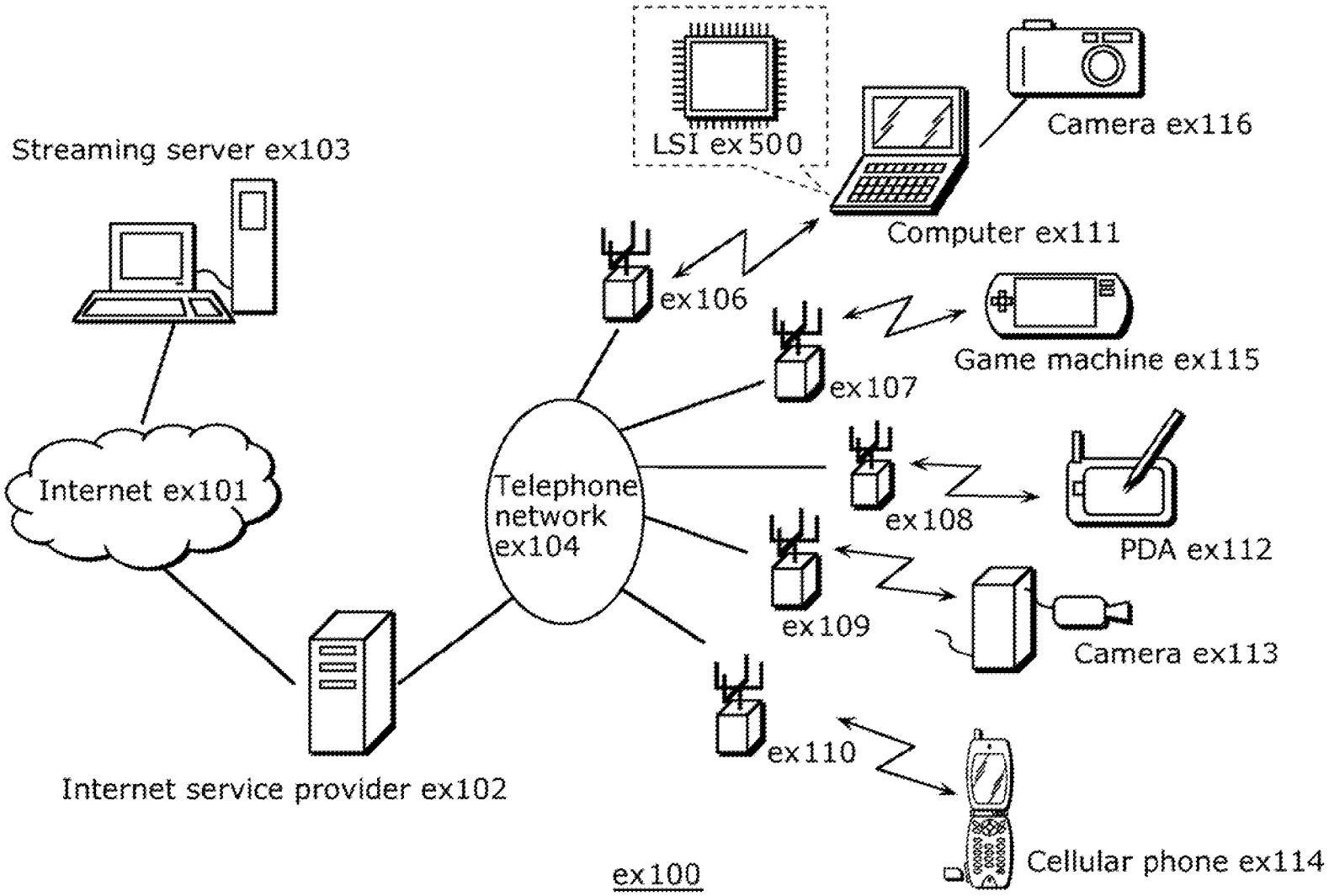
FIG. 15 is an overall configuration of a content providing system for implementing content distribution services.

FIG. 15 illustrates an overall configuration of a content providing system ex100 for implementing content distribution services. The area for providing communication services is divided into cells or desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 15, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the context providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chip. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have an particular right and equipment can implement personal broadcasting.

Figure 16:
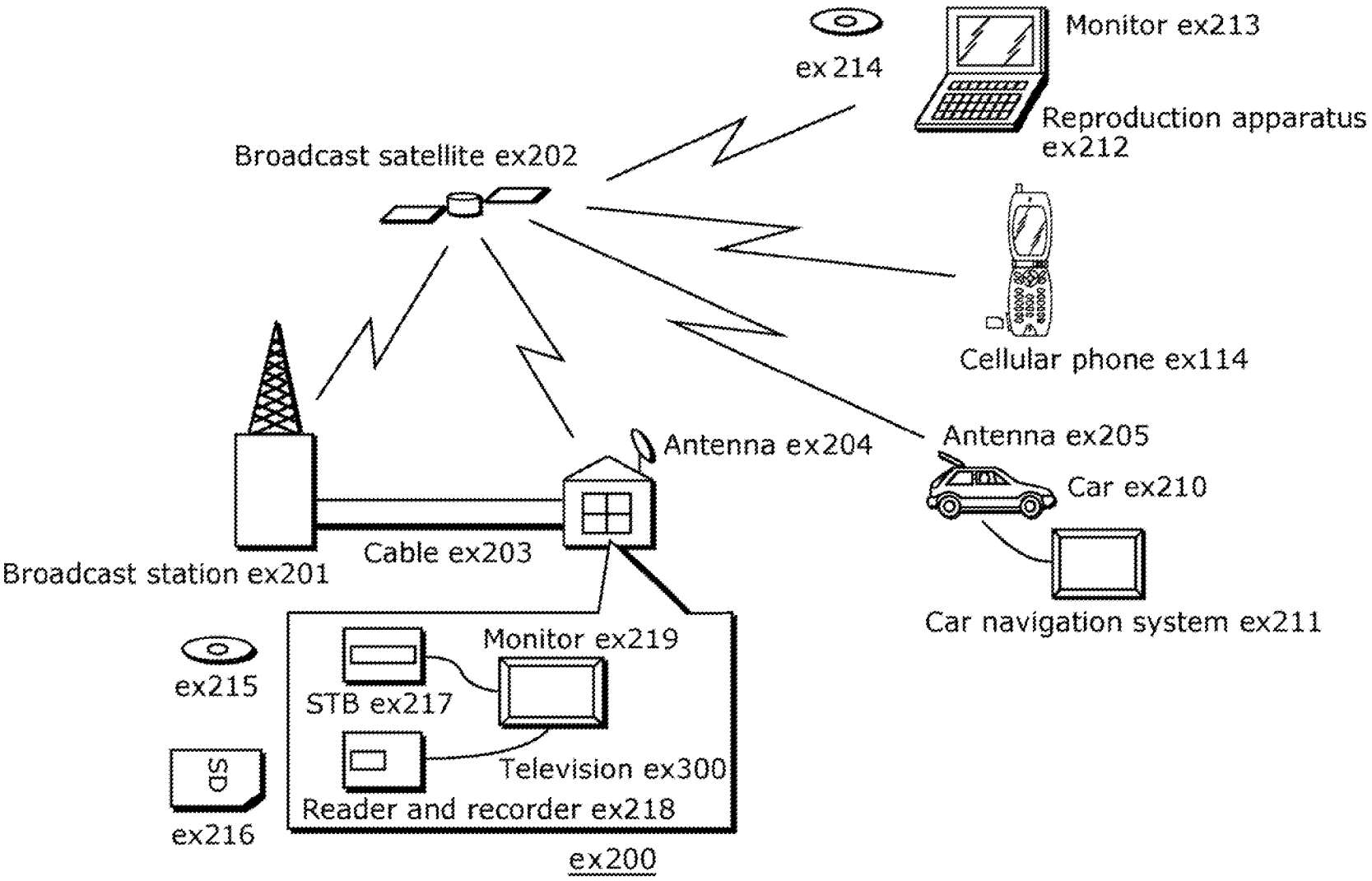
FIG. 16 shows an overall configuration of a digital broadcasting system.

Aside from the example of the content providing system ex100, at least one of the image coding apparatus and the image decoding apparatus described in each or embodiments may be implemented in a digital broadcasting system ex200 illustrated in FIG. 16. More specifically, a broadcast station ex201 communicates or transmits via radio waves to a broadcast satellite ex202, multiplexed data obtained by multiplexing audio data and others onto video data. The video data is data coded by the image coding method described in each of embodiments. Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data.

Furthermore, a reader/recorder ex218 (i) reads and decoder the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the image decoding apparatus or the image coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 ate television ex300. The moving picture decoding apparatus may be implemented not in the set top box but in the television ex300.

Figure 17:
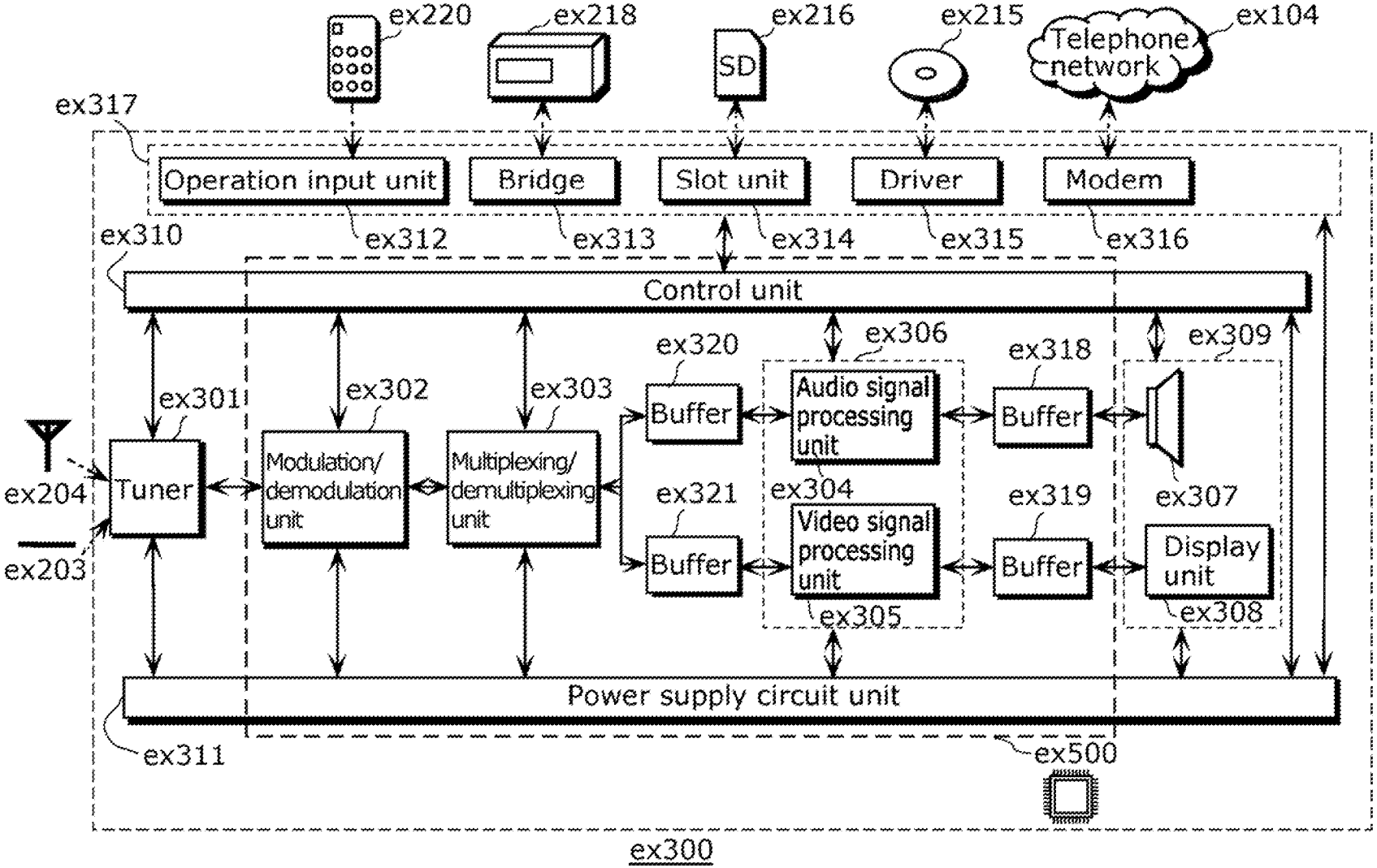
FIG. 17 shows a block diagram illustrating an example of a configuration of a television.

FIG. 17 illustrates the television (receiver) ex300 that uses the image coding method and the image decoding method described in each of embodiments, The television ex300) includes: a tuner ex301 that obtains or provides multiplexed data obtained by multiplexing audio data onto video data, through the antenna ex204 or the cable ex203, etc. that receives a broadcast; a modulation/demodulation turn, ex302 that demodulates the received multiplexed data or modulates data into multiplexed data to be supplied outside; and a multiplexing/demultiplexing unit ex303 that demultiplexes the modulated multiplexed data into video data and audio data or multiplexes video data and audio data coded by a signal processing unit ex300 into data.

The television ex300 further includes: a signal processing unit ex306 including an audio signal processing unit ex304 and a video signal processing unit ex305 that decade audio data and video data and code audio data and video data, respectively; and an output unit ex309 including a speaker as ex307 that provides the decoded audio signal, and a display unit ex308 that displays the decoded video signal, such as a display. Furthermore, the television ex300 includes an interface unit ex317 including, an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as all SD card; a driver ex315 to be connected to an external recording medium, such as a hard disk; and a modem ex316 to be connected to a telephone network. Here, the recording medium ex216 can electrically record information using a non-volatile/volatile semiconductor memory element storage. The constituent elements or the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each or embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signal are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 18:
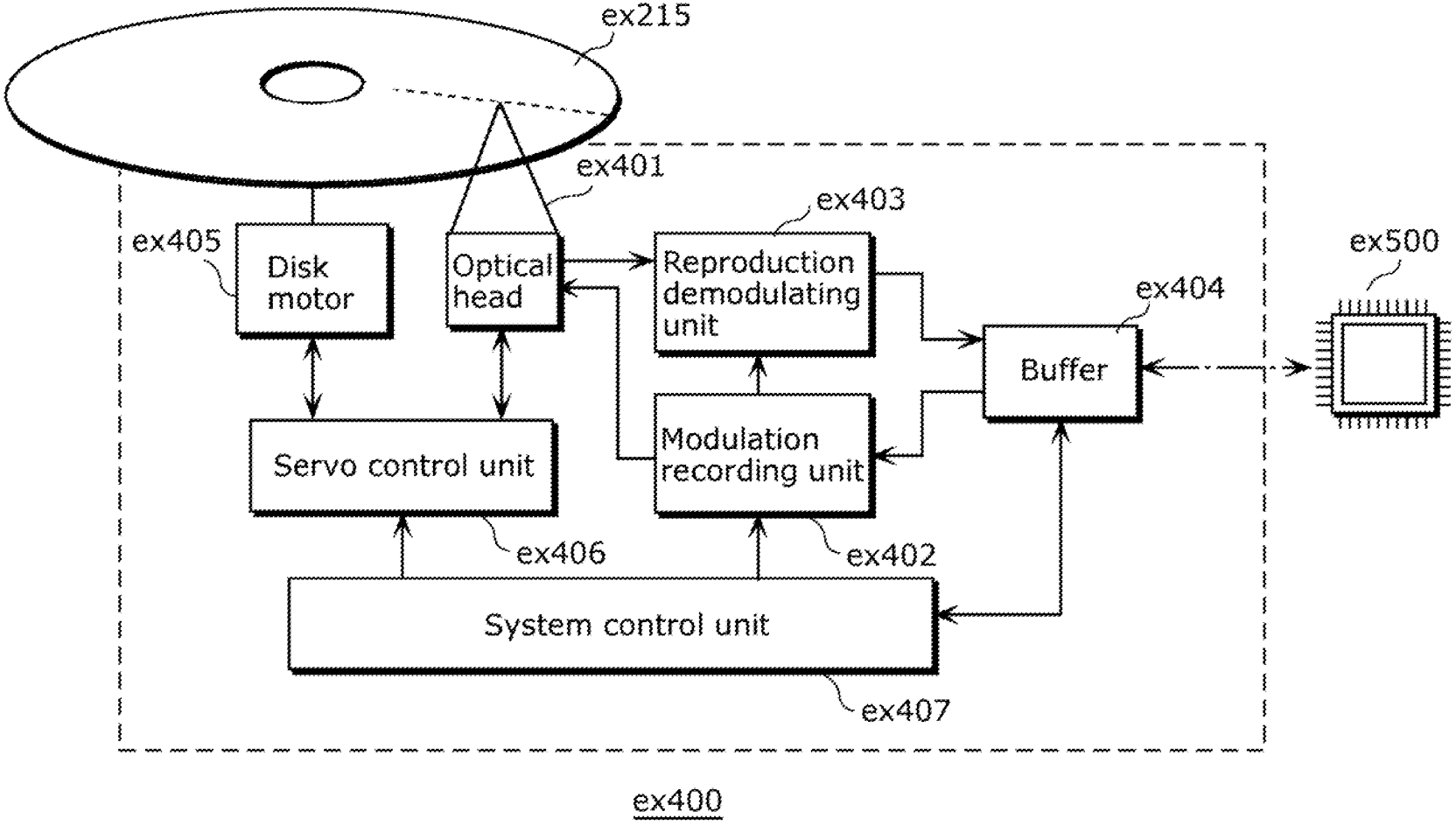
FIG. 18 shows a block diagram illustrating an example of a configuration of an information reproducing/recording unit that reads and writes information from and on a recording medium that is an optical disk.

As an example, FIG. 18 illustrates a configuration of an information reproducing/recording unit ex400 when data read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light front the recording surface of the recording medium ex215 to read the information. The modulation recording unit ex402 electrically drives a semiconductor laser included in the optical head ex401, and modulates he laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced to from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
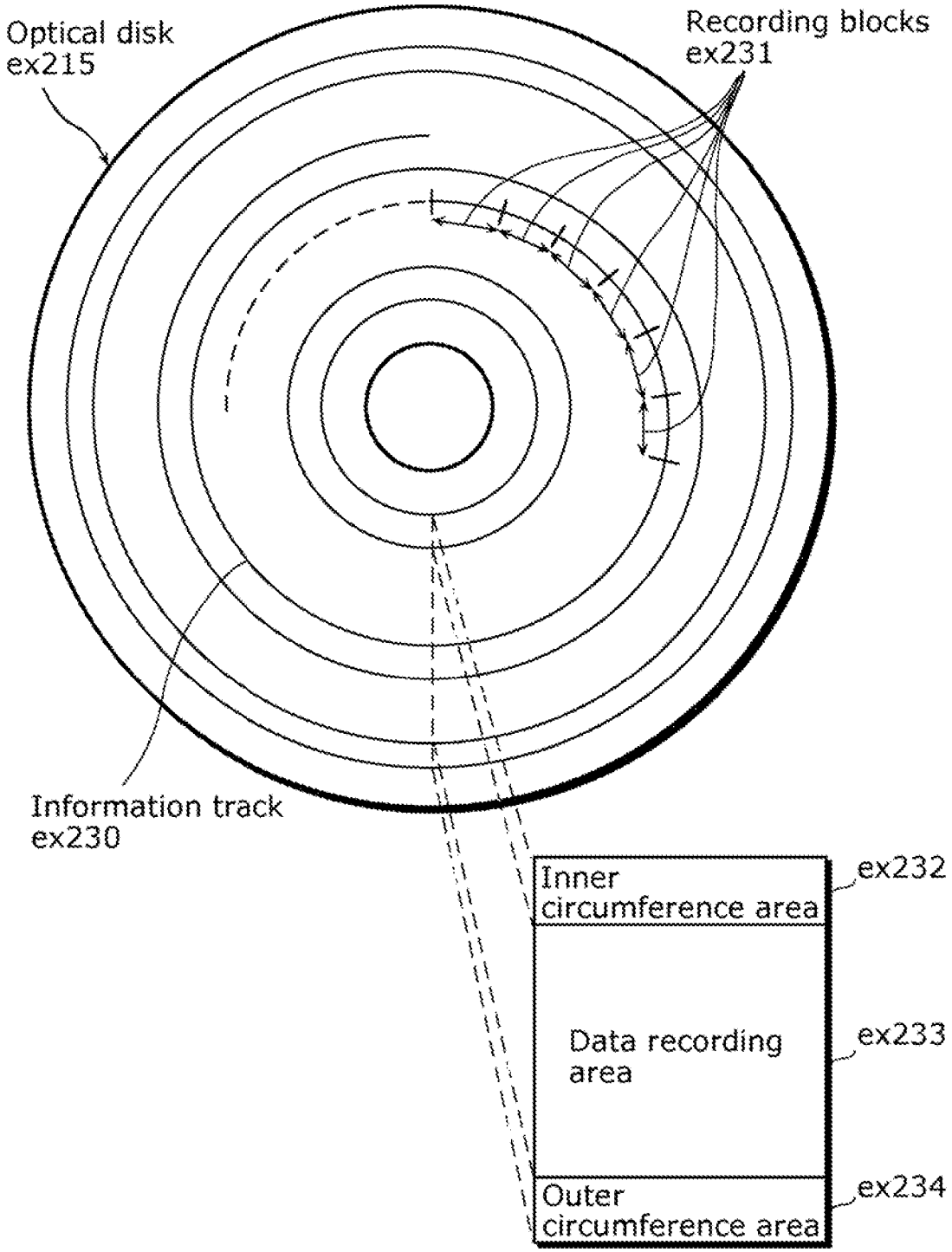
FIG. 19 shows an example of a configuration of a recording medium that is an optical disk.

FIG. 19 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description the optical disk is not limited to such, and may be an optical disk having a multi layer structure and capable of being recorded on a part other than the surface. Furthermore, the optical disk may have a structure for multidimensional recording/reproduction, such as recording of information using light of colors with different wavelengths in the same portion of the optical disk and recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example including a GPS receiving unit from the configuration illustrated in FIG. 17. The same will be true for the configuration of the computer ex111, the cellular phone ex411, and others.

Figure 20A:
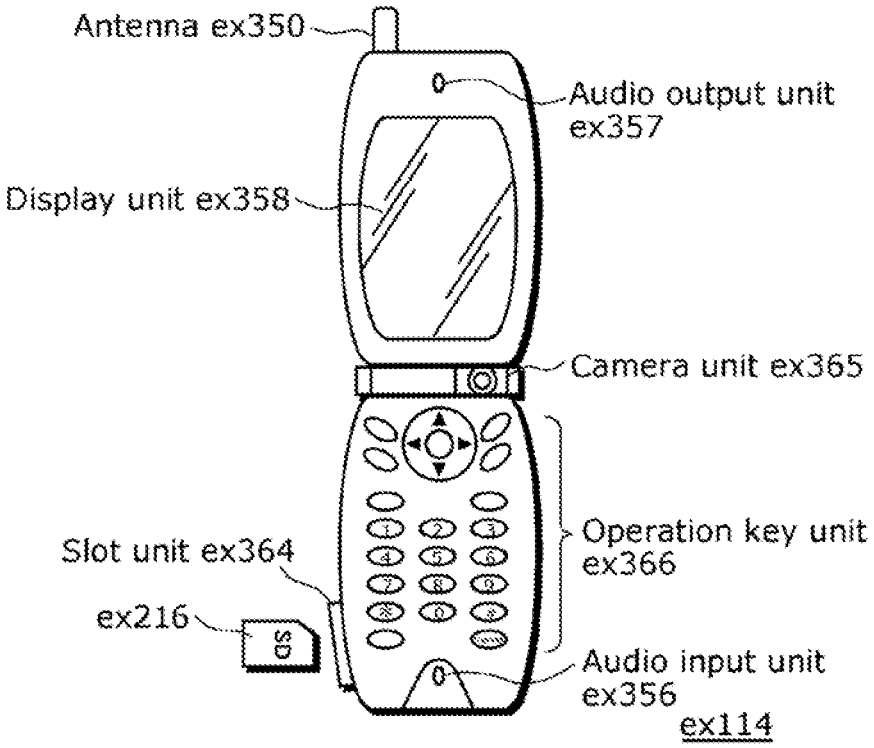
FIG. 20A shows an example of a cellular phone.

FIG. 20A illustrates the cellular phone ex114 that uses the image coding method and the image decoding method described in embodiments. The cellular phone ex114 includes: an antennas ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded date of the received video, the still pictures, e-mails, or others; and a slot unit ex364 that is an interface unit for a recording medium that stores data in the same manner as the memory unit ex367.

Figure 20B:
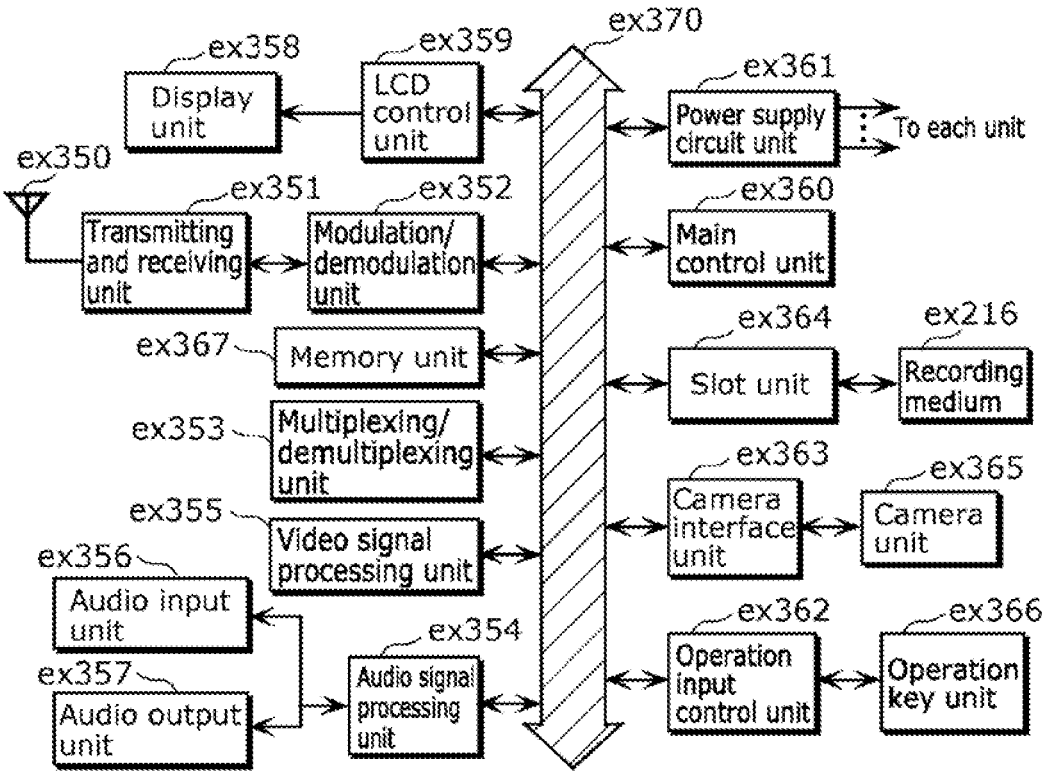
FIG. 20B shows a block diagram showing an example of a configuration of a cellular phone.

Next, an example of a configuration of the cellular phone ex114 will be described with reference to FIG. 20B. In the cellular phone ex114, a main control unit ex360 designed to control overall each unit of the main body including the display unit ex358 as well as the operation key limit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing, unit ex354 converts it into analog audio signals, so as to output theta via the audio output unit ex357.

Furthermore, when an e-mail in data communication mode is transmitted, text data of e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using an image decoding method corresponding to the image coding method shown in each of embodiments, and then the display unit ex358 displays, for instance, time video and still images included in the video file linked to the Web page via the LCD control unit ex359. Furthermore, be audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 3

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4, AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 21 illustrates a structure of the multiplexed data. As illustrated in FIG. 21, the multiplexed data can be obtained by multiplexing at least one of a video stream, at audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the image coding method or by the image coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included at the multiplexed data is identified by PID. For example, 0×1011 is allocated to the video stream to be used for video of a movie, 0×1100 to 0×111F are allocated to the audio streams, 0×1200 to 0×121F are allocated to the presentation graphics streams, 0×1400 to 0×141F are allocated to the interactive graphics streams, 0×1B00 to 0×1B1F are allocated to the video streams to be used for secondary video of the movie, and 0×1A00 to 0×1A1F are allocated to the audio streams to be used for the secondary audio to be mixed with the primary audio.

Figure 22:
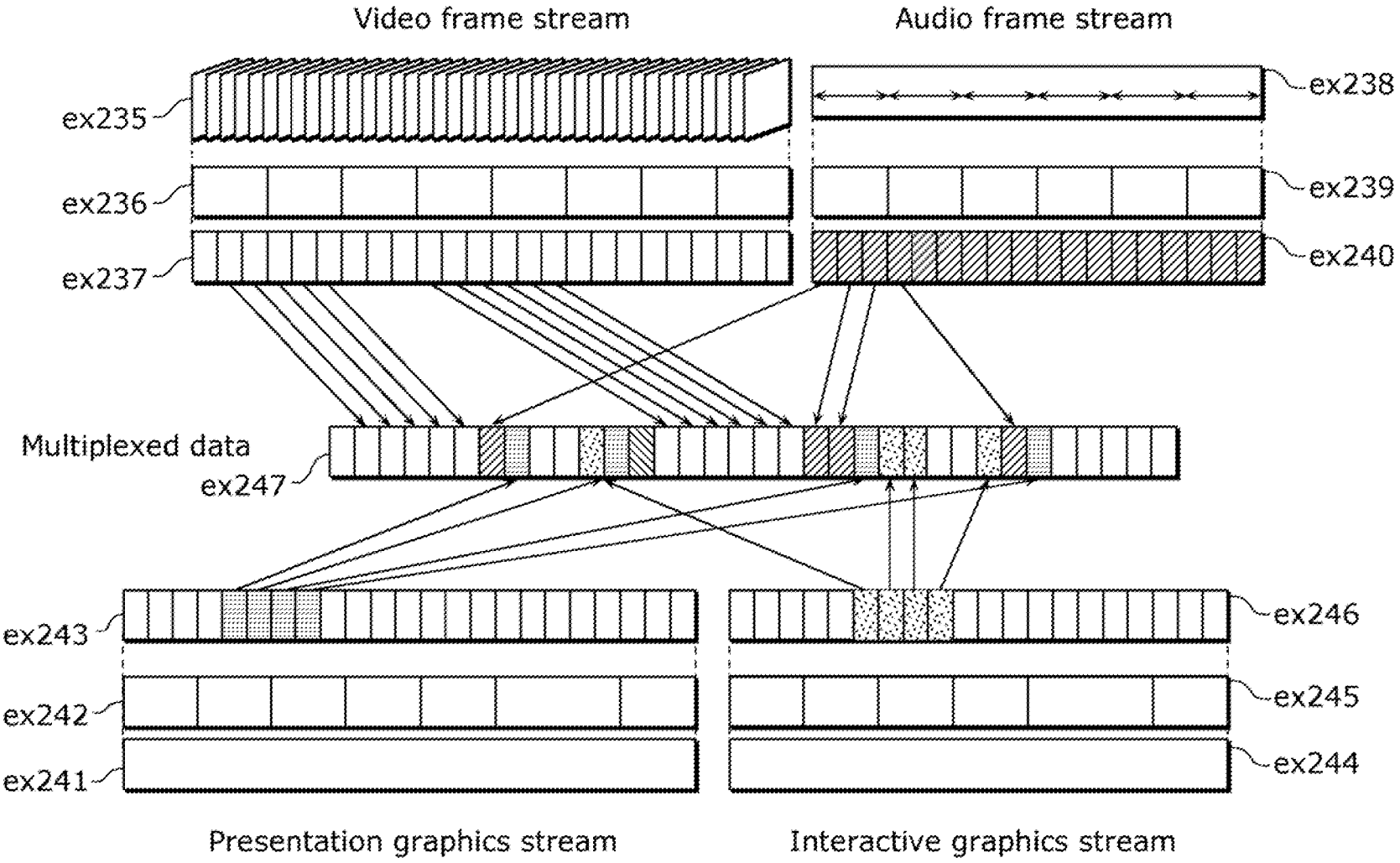
FIG. 22 schematically shows how each stream is multiplexed in multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packet ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
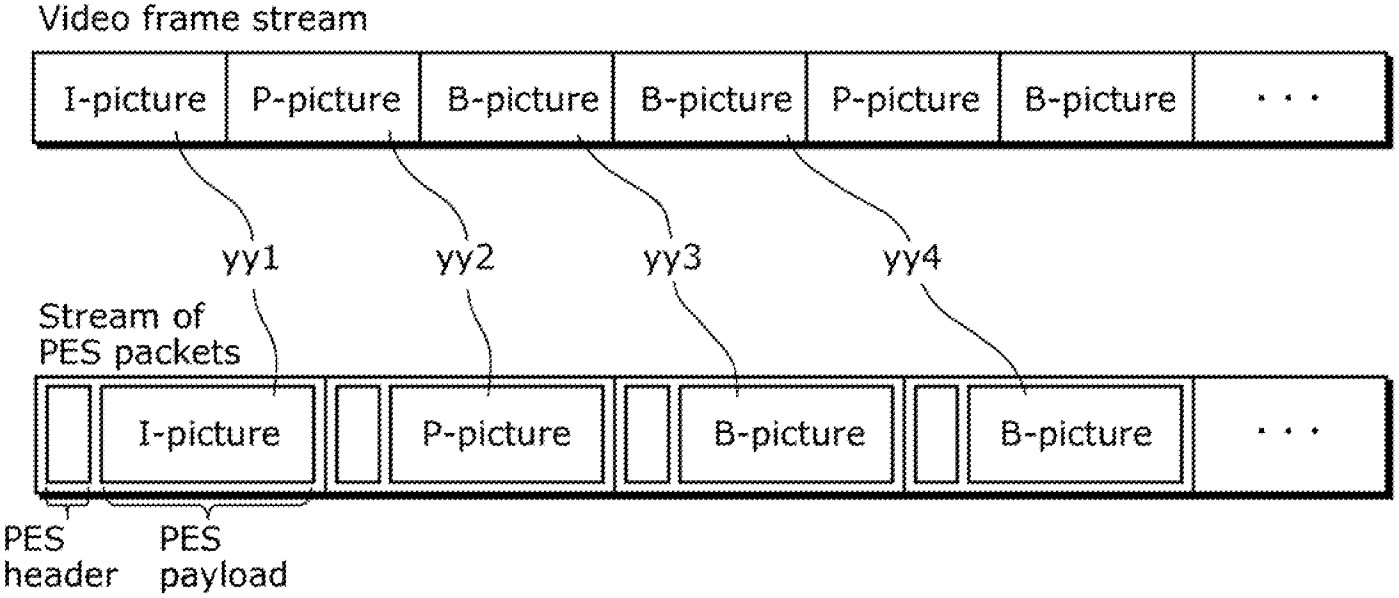
FIG. 23 shows how a video stream is stored in a stream of PES packets in more detail.

FIG. 23 illustrates hew a video stream is stored in a stream of PES packets in more detail. The first bar in FIG. 23 shows s a video frame stream in a video stream. The second bar shows the stream of PES packets. As indicated by arrows denoted as yy1, yy2, yy3, and yy4 in FIG. 23, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 24:
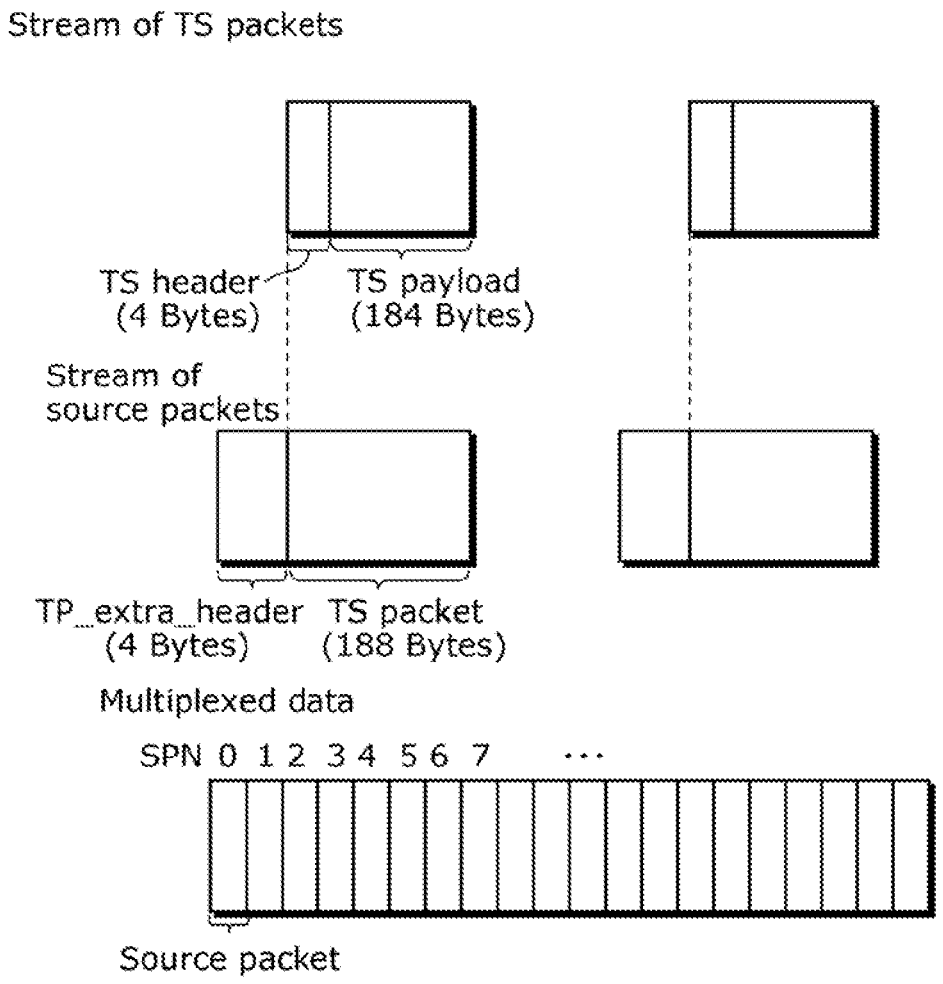
FIG. 24 shows a structure of TS packets and source packets in the multiplexed data.

FIG. 24 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT, a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 25:
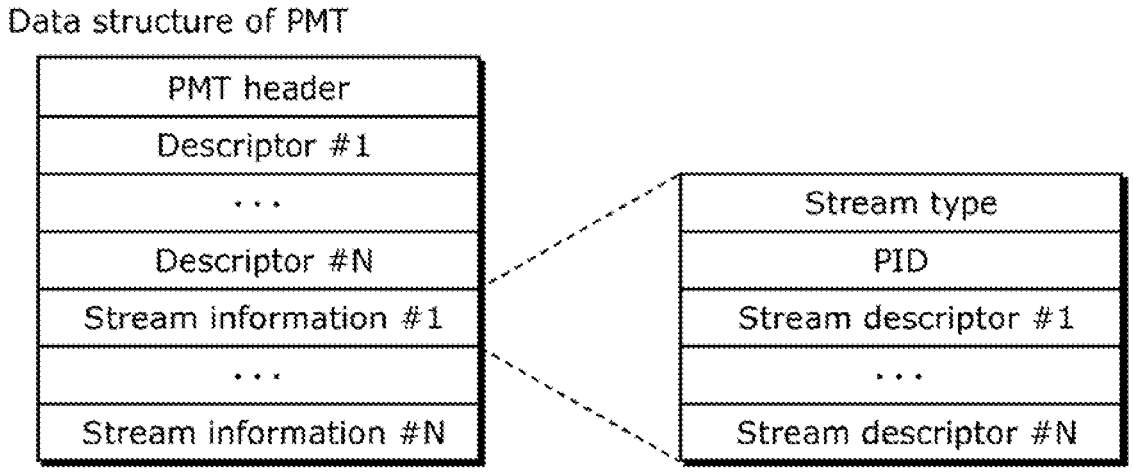
FIG. 25 shows a data structure of a PMT.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMI header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

Figure 26:
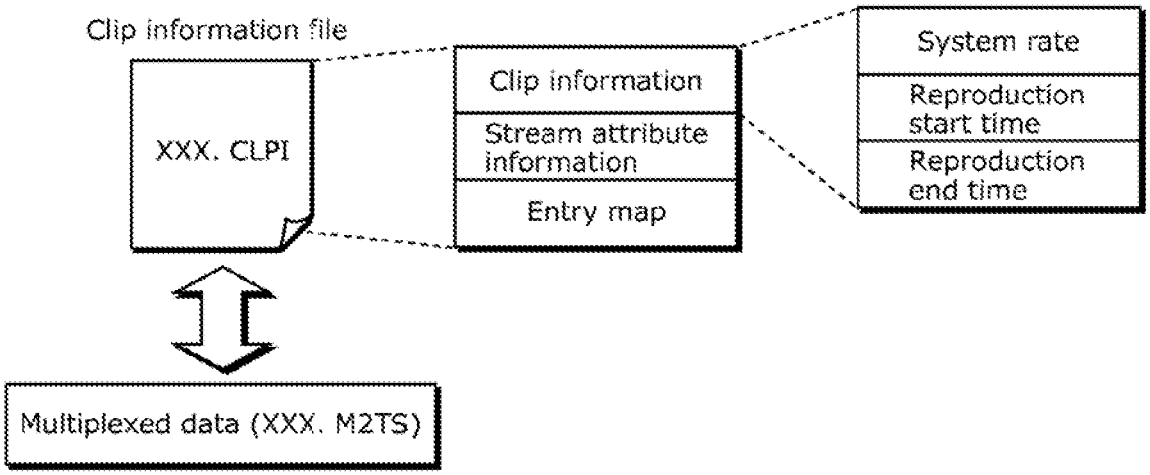
FIG. 26 shows an internal structure of multiplexed data information.

When the multiplexed data is recorded on a recording medium and others, it is recorded together with multiplexed data information files Each of the multiplexed data information files is management information of the multiplexed data as shown in FIG. 26. The multiplexed data information files are in one to one correspondence with the multiplexed data, and each of the files includes multiplexed data information, stream attribute information, and an entry map.

As illustrated FIG. 26. the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 27:
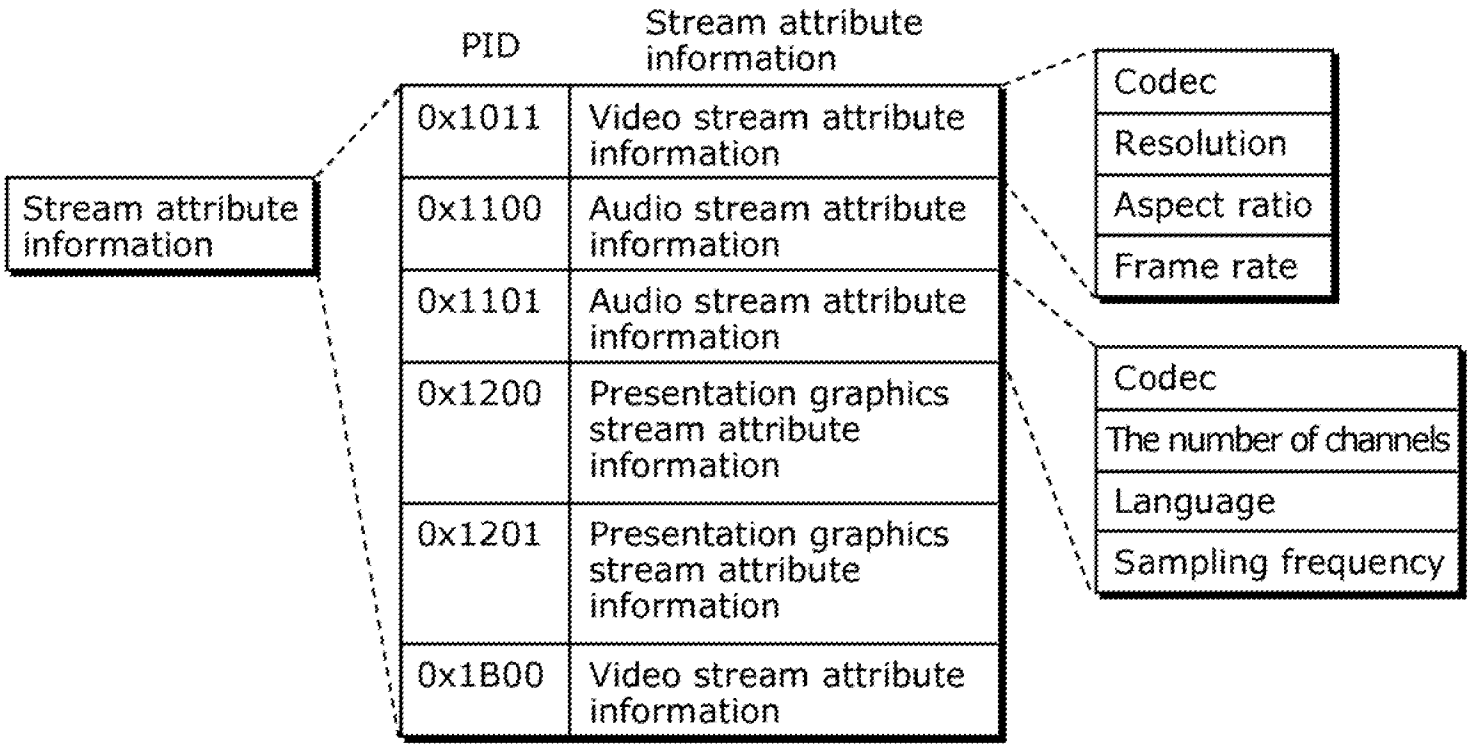
FIG. 27 shows an internal structure of stream attribute information.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codes is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the image coding method or the image coding apparatus described in each of embodiments includes a step or a unit for allocating unique information indicating video data generated by the image coding method or the image coding apparatus in each of embodiments, to the stream type included in the PMT or the video stream attribute information. With the configuration, the video data generated by the image coding method or the image coding apparatus described in each of embodiments can be distinguished from video data that conforms to another standard.

Figure 28:
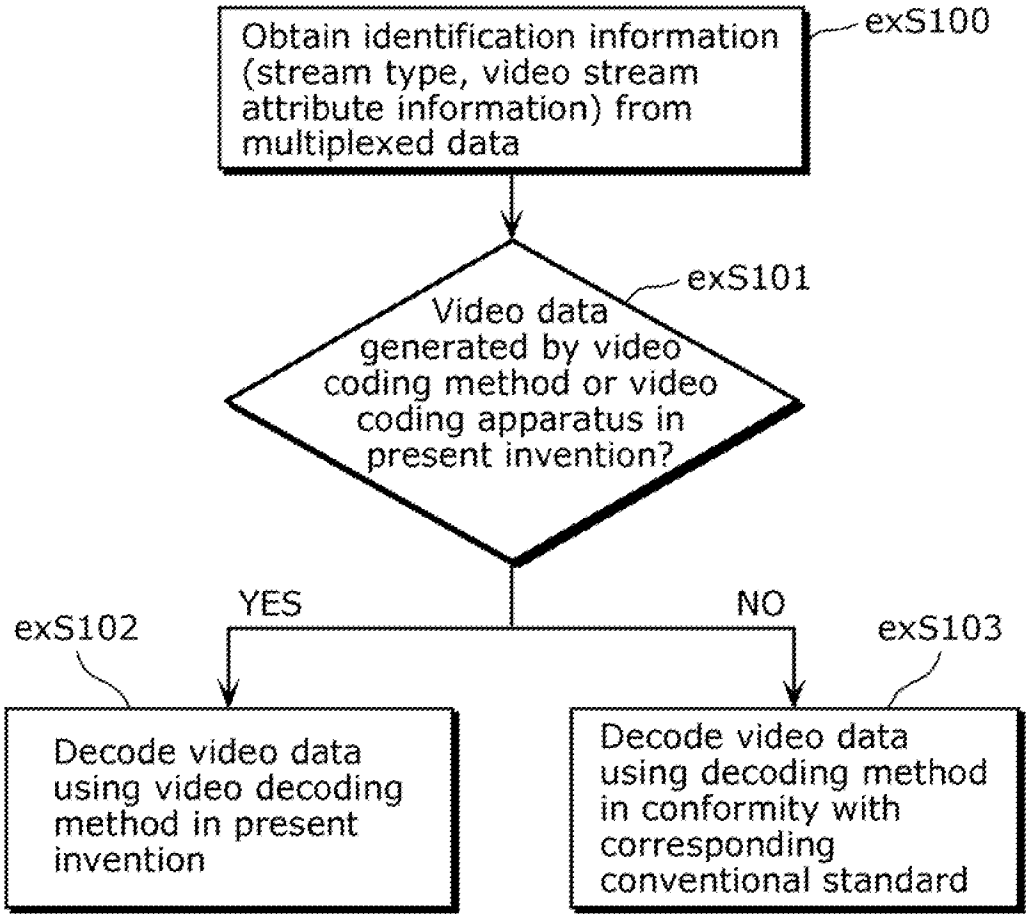
FIG. 28 shows steps for identifying video data.

Furthermore, FIG. 28 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the image coding method or the image coding apparatus in each of embodiments. When it is determined that the stream type or the video stream attribute information indicates that the multiplexed data is generated by the image coding method or the image coding apparatus in each of embodiments, in Step exS102, decoding is performed by the image decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the image decoding method or the image decoding apparatus that is described in each of embodiments can perform decoding. Even when multiplexed data that conforms to a different standard is input, an appropriate decoding method or apparatus can be selected. Thus, it becomes possible to decode information without any error. Furthermore, the image coding method or apparatus, or the image decoding method or apparatus in the present embodiment can be used in the devices and systems described above.

Embodiment 4

Figure 29:
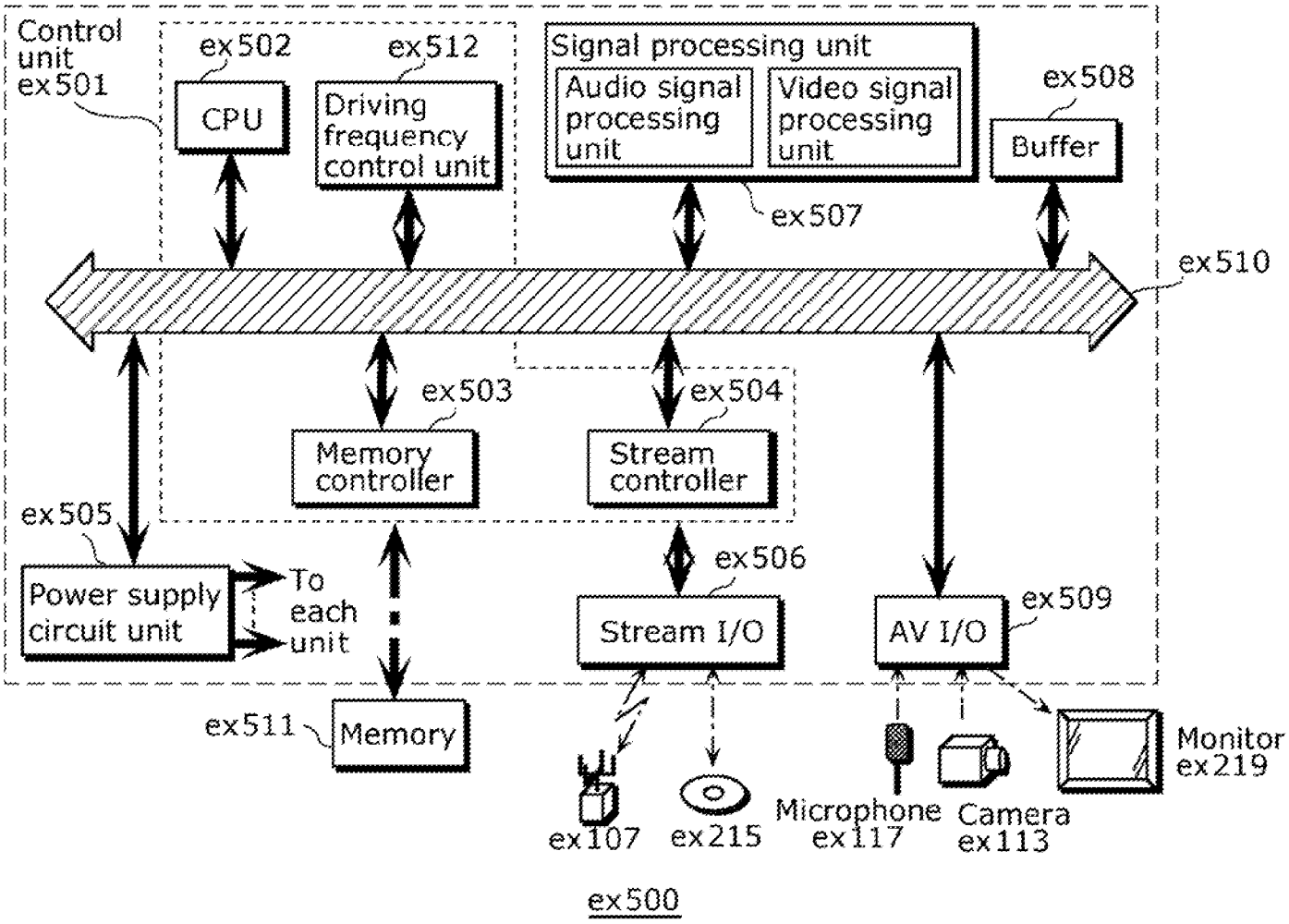
FIG. 29 shows an example of a configuration of an integrated circuit for implementing the moving picture coding method and the moving picture decoding method according to each of embodiments.

Each of the image coding method, the image coding apparatus, the image decoding method, and the image decoding apparatus in each of embodiments is typically achieved in the form of an integrated circuit or a Large Scale Integrated (LSI) circuit. As an example of the LSI, FIG. 29 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AVIO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream 10 ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500, The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501, is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration ate not limited to the LSI, and a special circuit or a general purpose processor and so forth can also achieve the integration. Field Programmable Gate Array (FPGA), that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 5

When video data generated in the image coding method or by the image coding apparatus described in each of embodiments is decoded, compared to when video data that conforms to a conventional standard. such as MPEG-2, MPEG-4 AVC, and VC-1 is decoded, the processing amount probably increases, Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 30:
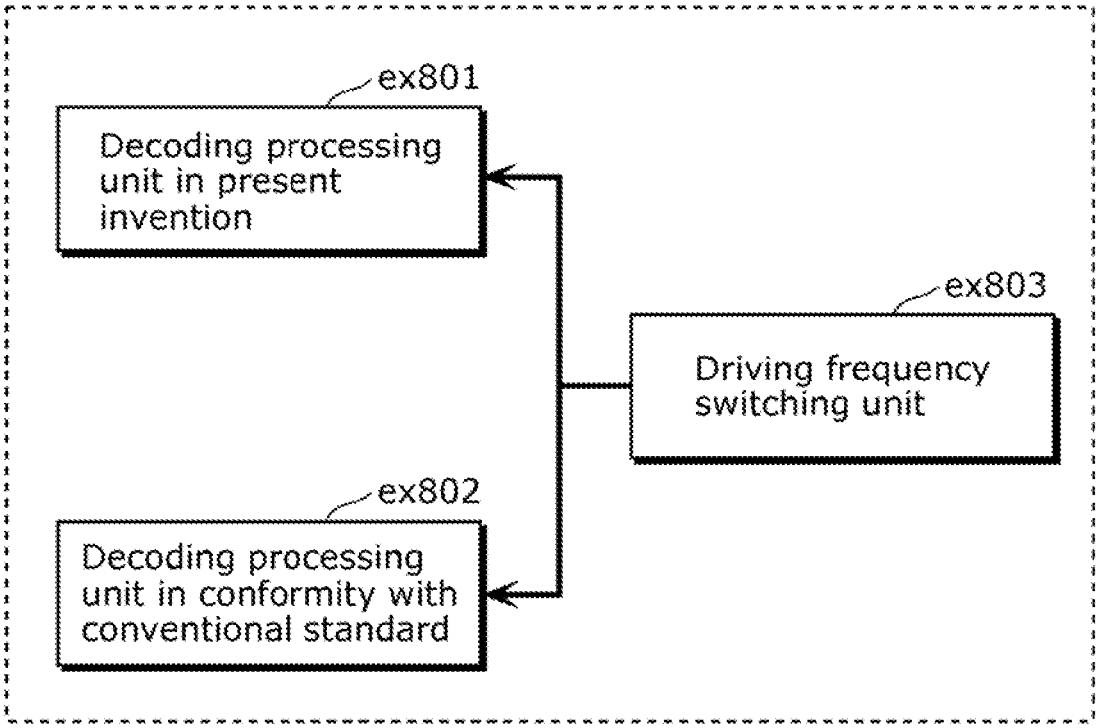
FIG. 30 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 30 illustrates a configuration ex800 in the present embodiment. A driving frequency switching unit ex803 sets a driving frequency to a higher driving frequency when video data is generated by the image coding method or the image coding apparatus described in each of embodiments. Then, the driving frequency switching unit ex803 instructs a decoding processing unit ex801 that executes the image decoding method described in each of embodiments to decode the video data. When the video date conforms to the conventional standard, the driving frequency switching unit ex803 sets a driving frequency to a lower driving frequency than that of the video data generated by the image coding method or the image coding apparatus described in each of embodiments. Then, the driving frequency switching unit ex803 instructs the decoding processing unit ex802 that conforms to the conventional standard to decode the video data.

Figures 32, 33A:
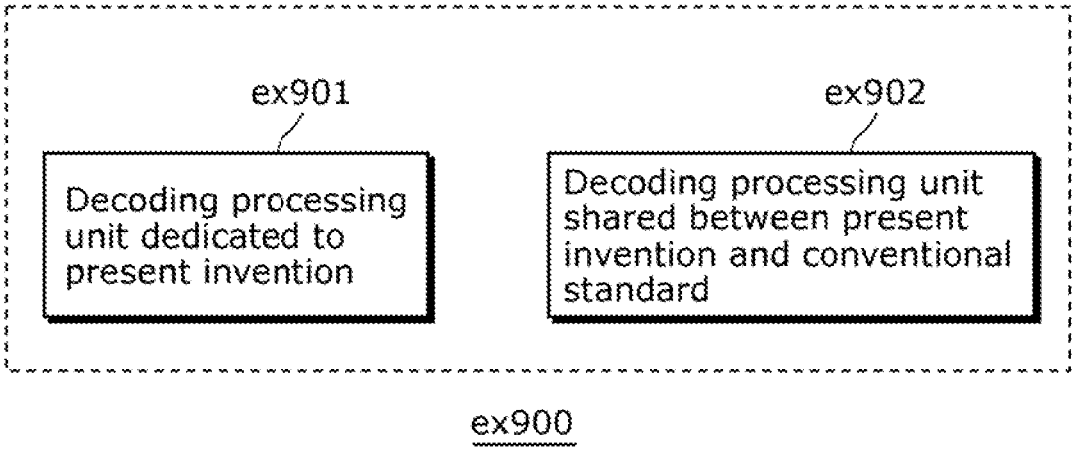
FIG. 32 show an example of a look-up table in which video data standards are associated with driving frequencies.
FIG. 33A is a diagram showing an example of a configuration for sharing a module of a signal processing unit.

More specifically, the driving frequency switching unit ex803 includes the CPU ex502 and the driving frequency control unit ex502 in FIG 29. Here, each of the decoding processing unit ex801 that executes the moving picture decoding method described in each of embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, he CPU ex502 selects a driving frequency based on, for example, a look-up table in which the standards of the video data are associated with the driving frequencies as shown in FIG. 32. The driving frequency can be selected by storing the look-up table in the buffer ex508 and in an internal memory of an LSI, and with reference to the look-up table be the CPU ex502.

Figure 31:
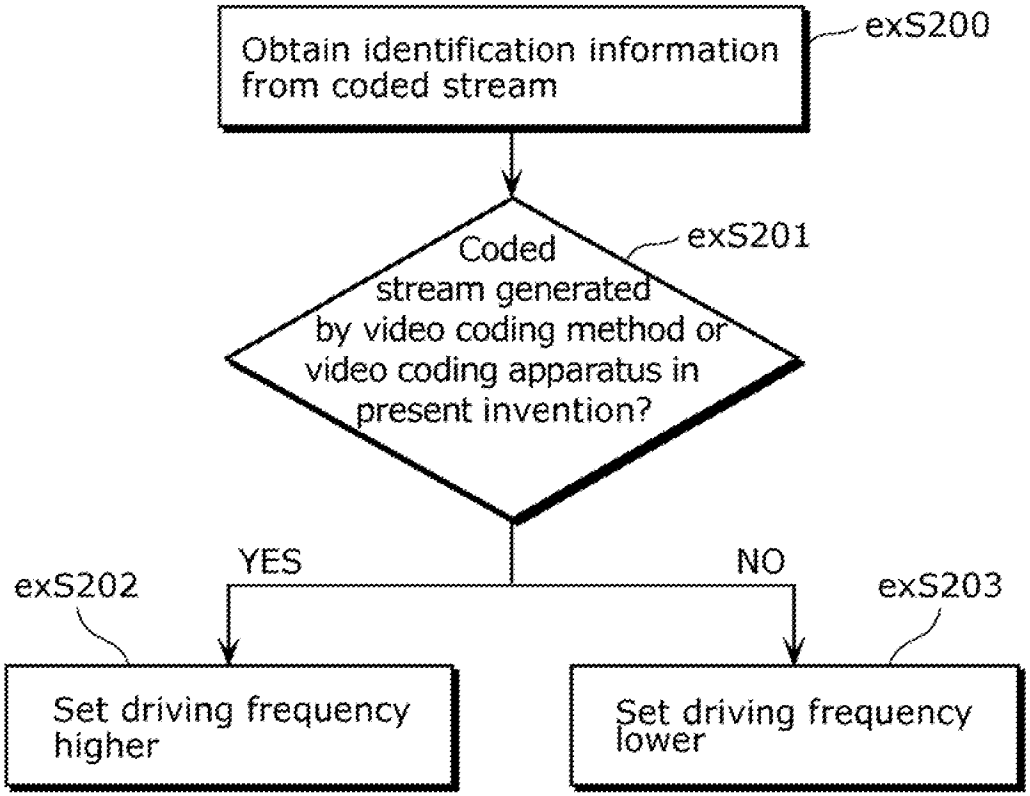
FIG. 31 shows steps for identifying video data and switching between driving frequencies.

FIG. 31 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202. the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such is MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the image coding method and the image coding apparatus described in each of embodiment.

Furthermore, along with the switching of the driving frequencies, the power conservation effect can be increased by changing the voltage to be applied to the LSI ex500 or an apparatus including the LSI ex500. For example. when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount her decoding is smaller, the driving frequency may be set lower as the method for setting the driving frequency. Thus, the setting method is not limited to the ones described above. For example, when the processing amount for decoding video data in conformity with MPEG-4, AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method her setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2. MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time, In such a case, the suspending time is probably set shorter than that in the case where when the identification information indicates that the video data conforms to the conventional standard, such as MPEG-2, MPEG-4 AVC, and VC-1.

Accordingly, the power conservation effect can be increased by switching between the driving frequencies in accordance with the standard to which the video data forms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex5O7 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 33A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. The decoding processing unit for implementing the moving picture decoding method described in each of embodiments may be shared for the processing to be shared, and a dedicated decoding processing unit may be used for processing unique to that of MPEG-4 AVC.

Figure 33B:
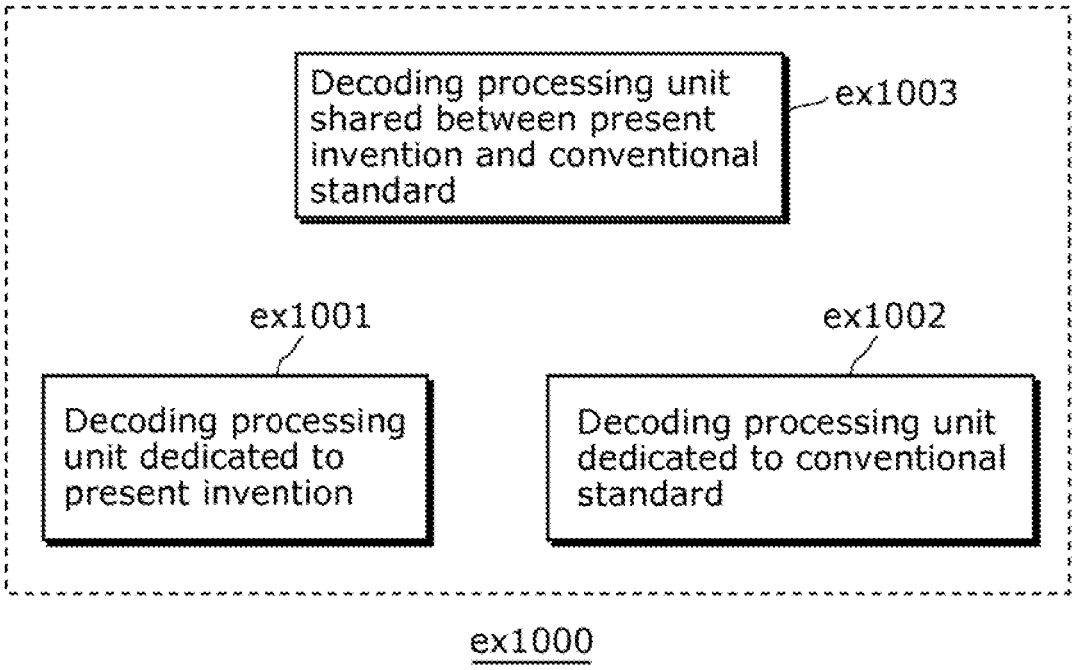
FIG. 33B is a diagram showing another example of a configuration for sharing a module of the signal processing unit.

Furthermore, ex1000 in FIG. 33B shows another example in that processing is partly shared. This example uses a configuration including a dedicated decoding, processing unit ex1001 that supports the processing unique to an aspect of the present invention, a dedicated decoding processing unit ex1002 that supports the processing unique to another conventional standard, and a decoding processing unit ex1003 that supports processing to be shared between the image decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the image decoding method according to the aspect of the present invention and the moving picture decoding method in conformity with the conventional standard.

INDUSTRIAL APPLICABILITY

The image coding method and the image decoding method according to the present invention has an effect of improve coding efficiency, and can be applied to a video camera, a mobile phone having the function of capturing and reproducing video, a personal computer, a recording and reproducing apparatus, or the like,

REFERENCE SIGNS LIST

1000 Image coding apparatus
1100 Coding processing unit
1101 Subtractor
1102 Orthogonal transform unit
1103 Quantization unit
1104 Entropy coding unit
1105 Inverse quantization unit
1106 Inverse orthogonal transform unit
1107 Adder
1108 Deblocking filter
1109 Memory
1110 Intra prediction unit
1111 Motion compensation unit
1112 Motion estimation unit
1113 Switch
1200 Coding processing unit
2000 Image decoding apparatus
2100 Decoding processing unit
2401 Entropy decoding unit
2102 Inverse quantization unit
2103 Inverse orthogonal transform unit
2104 Adder
2105 Deblocking filter
2106 Memory
2107 Intra prediction unit
2108 Motion compensation unit
2109 Switch
2200 Decoding control unit

The invention claimed is:

[1. An image decoding method for decoding a coded stream, the image decoding method comprising:

receiving a coded stream which includes a plurality of processing units and a header of the processing units, the coded stream having been generated by coding an image using inter prediction, wherein the processing units including at least one processing unit divided into a plurality of sub-processing units in a multiple-level hierarchy in which the size of a sub-processing unit at one level is larger than the size of a sub-processing unit at a lower level, wherein the hierarchy including a prediction unit that is sub-processing unit at a level lower than the highest level, wherein a reference index necessary for decoding said prediction unit is stored in either said processing unit that is divided or a sub-processing unit at a level higher than said prediction unit, and wherein said header including hierarchy depth information indicating the unit where the reference index is stored;

parsing said header to obtain said hierarchy depth information;

using said hierarchy depth information to obtain said reference index; and decoding said prediction unit using said reference index.]

[2. An image decoding apparatus for decoding a coded stream the image decoding apparatus comprising:

a hardware processor; and a non-transitory, computer-readable memory device coupled to said hardware processor, said hardware processor, using said memory device, perform the following steps:

receiving a coded stream which includes a plurality of processing units and a header of the processing units, the coded stream having been generated by coding an image using inter prediction, wherein the processing units including at least one processing unit divided into a plurality of sub-processing units in a multiple-level hierarchy in which the size of a sub-processing unit at one level is larger than the size of a sub-processing unit at a lower level, wherein the hierarchy including a prediction unit that is a sub-processing unit at a level lower than the highest level, wherein a reference index necessary for decoding said prediction unit is stored hi either said processing unit that is divided or a sub-processing unit at a level higher than said prediction unit, and wherein said header including hierarchy depth information indicating the unit where the reference index is stored;

parsing said header to obtain said hierarchy depth information;

using said hierarchy depth information to obtain said reference index; and decoding said prediction unit using said reference index.]

[3. An image decoding apparatus for decoding a coded stream, the image decoding apparatus comprising:

a receiver that receives a coded stream winch includes a plurality of processing units and a header of the processing units, the coded stream having been generated by coding an image using inter prediction, wherein the processing units including at least one processing unit divided into a plurality of sub-processing units in a multiple-level hierarchy in which the size of a sub-processing unit at one level is larger than the size of a sub-processing unit at a lower level, wherein the hierarchy including a prediction unit that is a sub-processing unit at a level lower than the highest level, wherein a reference index necessary for decoding said prediction unit is stored in either said processing unit that is divided or a sub-processing unit at a level higher than said prediction unit, and wherein said header including hierarchy depth information indicating the unit where the reference index is stored;

an identifier that parses said header to obtain said hierarchy depth information and uses said hierarchy depth information to obtain said reference index; and a decoder that decodes said prediction unit using said reference index.]

*4. A decoding method for decoding a coded stream to generate a picture, the coded stream including a coded picture including a plurality of sub coded units, each of the sub coded units including a plurality of sub prediction units, the decoding method comprising:*

*parsing a first flag which indicates whether a reference index is stored in a sub coded unit, the first flag being in a picture header of the coded picture;*

*determining whether or not the first flag indicates that the reference index is stored in the sub coded unit*

*when the first flag is determined to indicate that the reference index is stored in the sub coded unit, parsing the reference index stored in the sub coded unit and decoding the sub coded unit by performing inter prediction in which (i) each of sub prediction units included in the sub coded unit identify a prediction mode and (ii) the reference index stored in the sub coded unit is applied to all of the sub prediction units included in the sub coded unit; and*

*when the first flag is determined not to indicate that the reference index is stored in the sub coded unit, parsing reference indexes stored in sub prediction units included in the sub coded unit and decoding the sub prediction units by performing inter prediction in which (i) each of the sub prediction units included in the sub coded unit identify the prediction mode and (ii) the reference indexes stored in the sub prediction units are applied to the sub prediction units.*

*5. The decoding method according to claim 4, wherein the sub coded unit is a lowest coded unit.*

*6. The decoding method according to claim 4, wherein when the first flag is determined to indicate that the reference index is stored in the sub coded unit, the reference index stored in the sub coded unit is a combined reference index.*

* * * * *